(12) United States Patent
Horimoto et al.

(10) Patent No.: US 7,481,467 B2
(45) Date of Patent: Jan. 27, 2009

(54) COUPLING APPARATUS INCLUDING RELEASE PREVENTING STRUCTURE

(75) Inventors: Akira Horimoto, Tochigi (JP); Kazuyuki Tamada, Tochigi (JP)

(73) Assignee: Sakura Rubber Co., Ltd., Tokyo (JP)

( * ) Notice: Subject to any disclaimer, the term of this patent is extended or adjusted under 35 U.S.C. 154(b) by 0 days.

(21) Appl. No.: 11/704,360

(22) Filed: Feb. 9, 2007

(65) Prior Publication Data

US 2007/0132233 A1 Jun. 14, 2007

Related U.S. Application Data

(60) Division of application No. 10/933,429, filed on Sep. 3, 2004, now Pat. No. 7,243,953, which is a continuation of application No. PCT/JP03/02595, filed on Mar. 5, 2003.

(30) Foreign Application Priority Data

Mar. 5, 2002 (JP) ............... 2002-059341

(51) Int. Cl.
*F16L 37/22* (2006.01)
*F16L 37/113* (2006.01)
*F16L 37/252* (2006.01)

(52) U.S. Cl. ............... 285/377; 285/55; 285/82; 285/362; 285/376; 285/401

(58) Field of Classification Search ............ 285/55, 285/81, 82, 360, 362, 376, 377, 401
See application file for complete search history.

(56) References Cited

U.S. PATENT DOCUMENTS

| | | |
|---|---|---|
| 1,611,286 A | 12/1926 | Shaff |
| 2,695,797 A | 11/1954 | McCarthy et al. |
| 3,155,402 A | 11/1964 | Cornelius |
| 3,194,594 A | 7/1965 | Hagler |
| 3,253,842 A | 5/1966 | Rabe |
| 3,877,731 A | 4/1975 | Kraus et al. |
| 4,097,069 A * | 6/1978 | Morrill ............... 285/84 |
| 4,271,865 A * | 6/1981 | Galloway et al. ...... 137/614.06 |
| 4,443,030 A * | 4/1984 | Hairston et al. ............ 285/263 |
| 4,524,997 A * | 6/1985 | Ebert ................ 285/74 |
| 4,613,162 A * | 9/1986 | Hughes .............. 285/27 |
| 4,613,164 A * | 9/1986 | Hughes et al. .......... 285/27 |
| 5,184,851 A | 2/1993 | Sparling et al. |
| 5,741,084 A * | 4/1998 | Del Rio et al. ........... 403/349 |
| 5,857,713 A | 1/1999 | Horimoto |
| 6,102,444 A * | 8/2000 | Kozey ................ 285/79 |

(Continued)

FOREIGN PATENT DOCUMENTS

EP  0 770 809  5/1997

(Continued)

*Primary Examiner*—James M Hewitt
(74) *Attorney, Agent, or Firm*—Nixon & Vanderhye P.C.

(57) ABSTRACT

A coupling apparatus includes a pair of cylindrical coupling main bodies which are concentrically and oppositely arranged to each other and which have the same structure as to each other, liners which are accommodated in the coupling main bodies respectively, and a release preventing structure which can selectively resist a rotational force applied to the coupling main bodies coupled with each other, so that a coupling of the coupling main bodies is maintained.

1 Claim, 20 Drawing Sheets

U.S. PATENT DOCUMENTS

| | | |
|---|---|---|
| 6,382,680 B1 | 5/2002 | Horimoto |
| 6,594,881 B2 * | 7/2003 | Tibbitts .................. 29/450 |
| 6,863,314 B2 | 3/2005 | Guest |
| 2006/0273587 A1 * | 12/2006 | Ambrosi .................. 285/401 |

FOREIGN PATENT DOCUMENTS

| | | |
|---|---|---|
| JP | 9-280454 | 10/1997 |
| JP | 3107507 | 9/2000 |

* cited by examiner

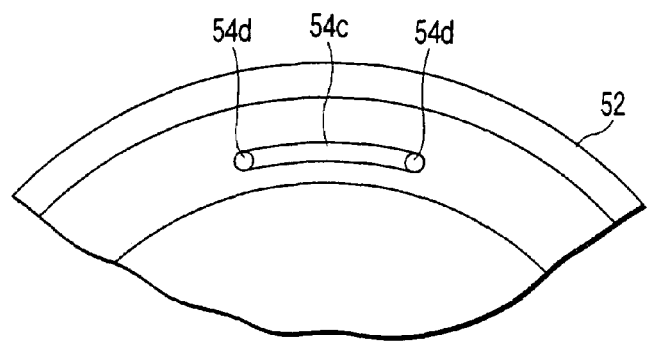
F I G. 7
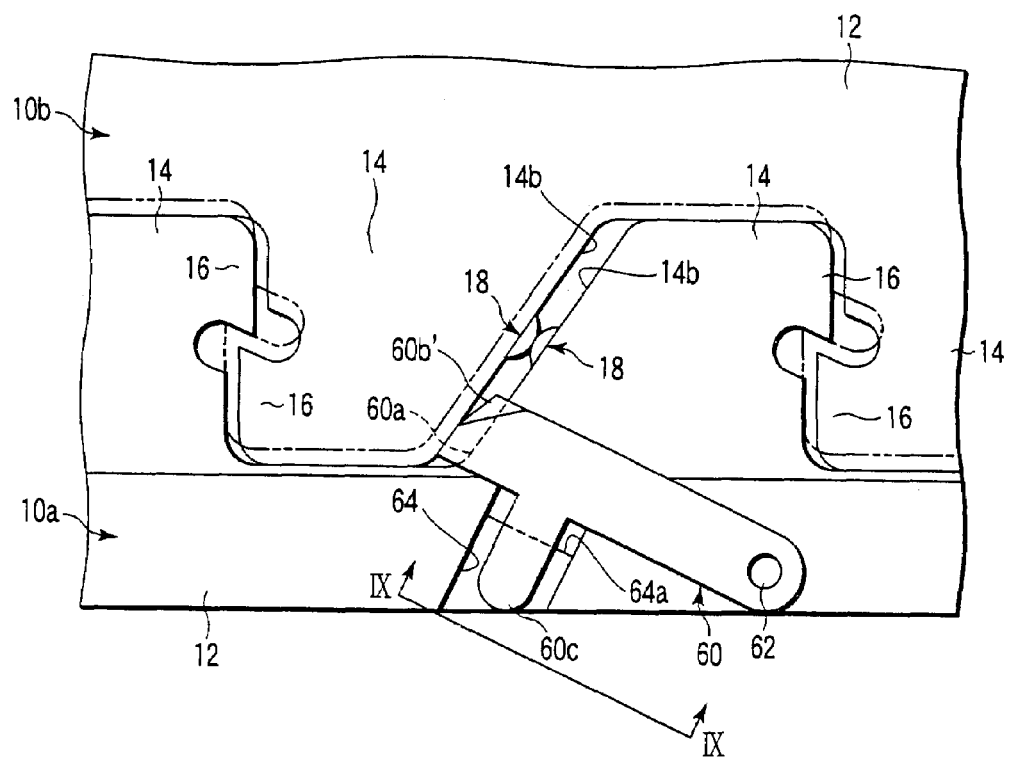
F I G. 8

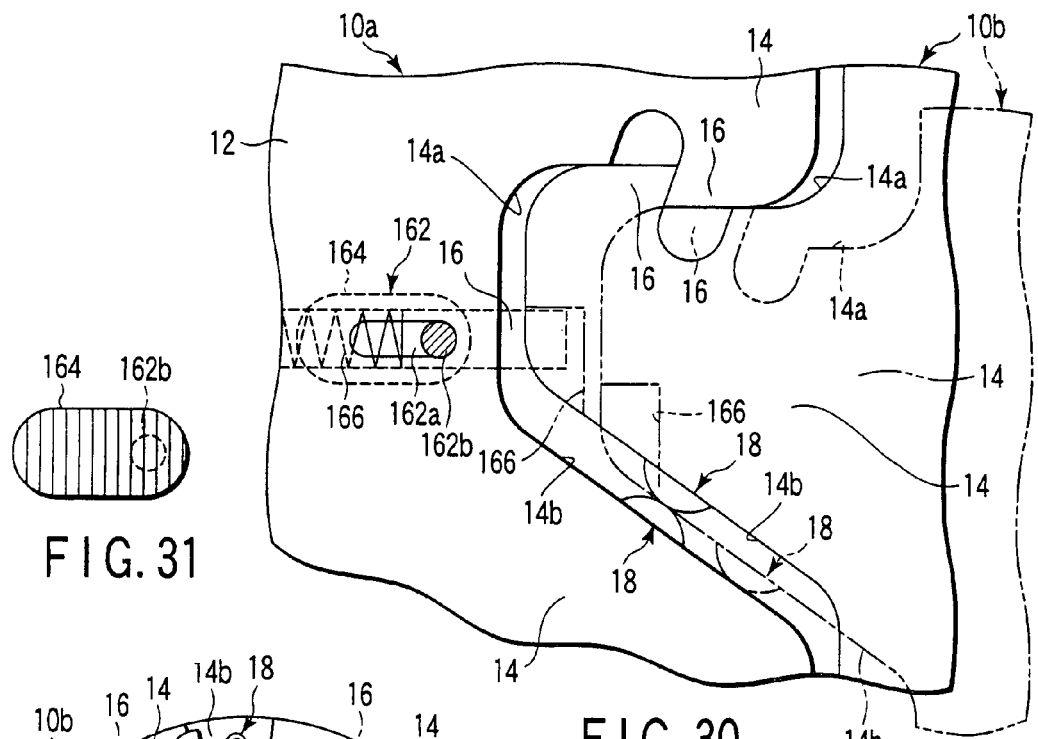
FIG. 31
FIG. 30
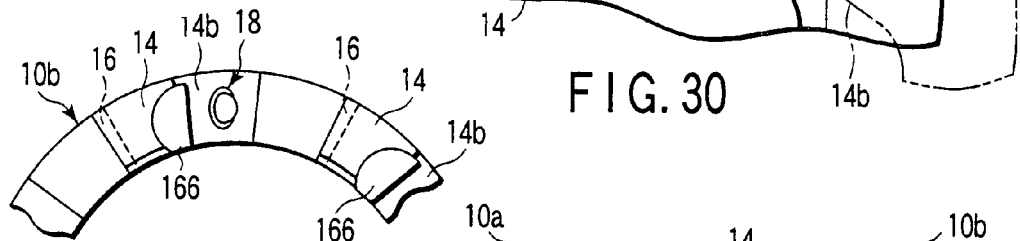
FIG. 32
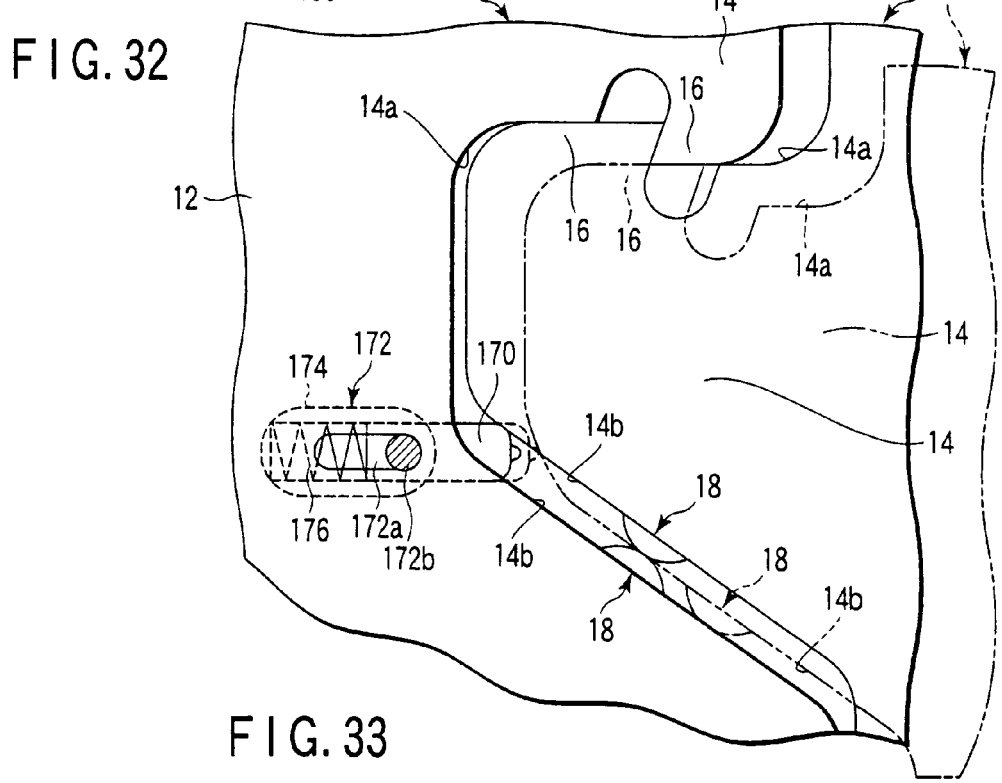
FIG. 33

COUPLING APPARATUS INCLUDING RELEASE PREVENTING STRUCTURE

CROSS-REFERENCE TO RELATED APPLICATIONS

This application is a divisional of U.S. patent application Ser. No. 10/933,429, filed Sep. 3, 2004, U.S. Pat. No. 7,243,953; which is a continuation of PCT International Patent Application No. PCT/JP03/02595, filed Mar. 5, 2003, which was not published under PCT Article 21(2) in English. PCT International Patent Application No. PCT/JP03/02595 claims the benefit of priority from prior Japanese Patent Application No. 2002-059341, filed Mar. 5, 2002. The entire contents of these applications are herein incorporated by reference.

BACKGROUND OF THE INVENTION

1. Field of the Invention

The present invention relates to a coupling apparatus including a release preventing device.

2. Description of the Related Art

A coupling apparatus which includes a pair of couplers having the same structure as to each other and to be coupled with each other only by moving them closer to each other after they are coaxially arranged is known from Japanese Patent No. 3107507.

A structure of the coupling apparatus concerning this patent will now be described with reference to FIGS. 41 to 43. FIG. 41 shows a perspective view of a pair of couplers 10a and 10b in a state that they are separated from each other. FIG. 42 shows a side view of one coupler 10a shown in FIG. 41 and a vertical cross-sectional view of the other coupler 10b shown in FIG. 41.

Each of the pair of couplers 10a and 10b comprises a cylindrical coupling main body 12. A plurality of projecting portions 14 are formed at a plurality of positions separated from each other at equal intervals in a circumferential direction on one end surface of the coupling main body 12. Each of the projecting portions 14 projects outward in a direction equal to an extending direction of a longitudinal center line of the coupling main body 12.

In each of the projecting portions 14, one side surface 14a facing in one circumferential direction of the coupling main body 12 extends in the direction equal to the extending direction of the longitudinal center line. On the one side surface 14a, an engagement piece 16 protruding in the one circumferential direction mentioned above is formed at a position adjacent to a projecting end of the projecting portion 14.

FIG. 43 shows the projecting portions 14 and 14 of the coupling main bodies 12 and 12 in a state that the couplers 10a and 10b are coupled with each other, in an enlarged manner. As well shown in FIG. 43, the engagement piece 16 includes an engagement surface 16a extending in a circumferential direction of the coupling main body 12 and facing in a direction opposite to the projecting direction of the projecting portion 14. The engagement surface 16a is inclined in such a manner that a base end of the engagement surface 16a at a base of the engagement piece 16 is positioned outward from a protruding end of the engagement surface 16a at a protruding end of the engagement piece 16 in the projecting direction of the projecting portion 14. A stress relaxation groove 17 having a substantially U-shape is formed on the one side surface 14a of the projecting portion 14 at the base end of the engagement surface 16a. The stress relaxation groove 17 prevents a stress loaded on the engagement surface 16a from concentrating on the base end of the engagement surface 16a.

The other side surface 14b facing in the other circumferential direction of the coupling main body 12 in each of the projecting portions 14 is inclined in such a manner that a base end of the other side surface 14b is closer to the adjacent projecting portion 14 as compared with a projecting end of the other side surface 14b. An urging unit 18 is set at a predetermined position on the inclined other side surface 14b. The urging unit 18 includes a cylindrical cup shaped case 18a embedded in the inclined other side surface 14b at the predetermined position. A compression coil spring 18b and a ball 18c are accommodated in an inner space of the cylindrical cup shaped case 18a. The compression coil spring 18b urges the ball 18c toward an opening of the case 18a. Since a diameter of the opening is set slightly smaller than a diameter of the ball 18c, the urged ball 18c does not jump out from the opening.

Tool engagement grooves 20 are formed on an outer peripheral surface of the coupling main body 12.

A cylindrical liner 22 is fixed on a region near to the projecting portions 14 in an inner peripheral surface of the coupling main body 12. One end portion of the liner 22 positioned near to the projecting portions 14 is surrounded by the projecting portions 14 of the coupling main body 12, and protrudes between the projecting end and the base end of each of the projecting portions 14 of the coupling main body 12. An annular seal member 24 is attached on a protruding end of the one end portion of the liner 22. A region positioned away from the projecting portions 14 in the inner peripheral surface of the coupling main body 12 is configured as a rod-like or tubular member fixing portion 26 to which an end portion of a rod-like member or a tubular member is fixed. In the conventional coupling apparatus shown in FIGS. 41 to 43, one end portion of a fire hose 28 is fixed to the tubular member fixing portion 26.

In order to couple the pair of couplers 10a and 10b of the conventional coupling apparatus having the above-described structure with each other, at first, the couplers 10a and 10b are coaxially arranged in such a manner that the projecting portions 14 of one coupler 10a are opposed to a plurality of indents between the projecting portions 14 of the other coupler 10b. Then, the couplers 10a and 10b are moved closer to each other, and the projecting portions 14 of the one coupler 10a are inserted into the indents between the projecting portions 14 of the other coupler 10b. Immediately before the protruding ends of the projecting portions 14 of the one coupler 10a reach bottom surfaces of the indents between the projecting portions 14 of the other coupler 10b, the ball 18c of the urging unit 18 in the inclined other side surface 14b of each of the projecting portions 14 of the one coupler 10a comes into contact with the ball 18c of the urging unit 18 in the inclined other side surface 14b of each of the projecting portions 14 of the other coupler 10b. Then, the urging units 18 urges the pair of couplers 10a and 10b in such a manner that they are separated from each other along the longitudinal center line of each of the coupling main bodies 12 and they are rotated in the circumferential direction of each of the coupling main bodies 12. As a result, circumferentially protruding ends of the engagement pieces 16 of the projecting portions 14 of the one coupler 10a comes into contact with circumferentially protruding ends of the engagement pieces 16 of the projecting portions 14 of the other coupler 10b. In this state, when the pair of couplers 10a and 10b are further moved closer to each other against urging forces of the urging units 18, the circumferentially protruding ends of the engagement pieces 16 of the projecting portions 14 of the one coupler 10a and the circumferentially protruding ends of the engagement pieces 16 of the projecting portions 14 of the other coupler 10b slide on each other in a direction along the longitudinal centerline. At last, as shown in FIG. 43, the inclined engagement surfaces 16a of the engagement pieces 16 of the projecting portions 14 of the one coupler 10a are engaged with the inclined engagement surfaces 16a of the engagement pieces 16 of the projecting portions 14 of the other coupler 10b in the direction along the longitudinal centerline. This engagement is maintained by the above described urging force.

At this time, the seal member 24 of the liner 22 of the one coupler 10a comes into contact with the seal member 24 of the liner 22 of the other coupler 10b, thereby sealing a gap therebetween.

When pressurized water is flowed in the fire hose 28 while the pair of couplers 10a and 10b are coupled with each other as described above, the pressurized water pushes the seal members 24 of the liners 22 of the pair of couplers 10a and 10b outward in a radial direction of each of the liners 22. As a result, the liners 22 of the couplers 10a and 10b are pushed in directions in which the liners 22 are separated from each other along longitudinal center lines of the liners 22. The pushing forces along the longitudinal center lines strengthen the engagements between the inclined engagement surfaces 16a of the engagement pieces 16 of the projecting portions 14 of the one coupler 10a and the inclined engagement surfaces 16a of the engagement pieces 16 of the projecting portions 14 of the other coupler 10b.

In order to separate the coupled couplers 10a and 10b from each other, the other coupler 10b is moved closer to the one coupler 10a in the direction along the longitudinal center lines against the urging forces of the urging units 18 and then the couplers 10a and 10b are rotated relative to each other while the supply of the pressurized water into the fire hose 28 is stopped and the pushing of the seal members 24 by the pressurized water is stopped. As a result, the engagements between the inclined engagement surfaces 16a of the engagement pieces 16 of the projecting portions 14 of the one coupler 10a and the inclined engagement surfaces 16a of the engagement pieces 16 of the projecting portions 14 of the other coupler 10b are released. Subsequently, the urging forces of the urging units 18 urge the pair of couplers 10a and 10b in such a manner that couplers 10a and 10b are separated from each other along the longitudinal center lines thereof.

The above-described movements along the longitudinal center lines of the pair of couplers 10a and 10b and the above-described rotations thereof, which are required for separating the couplers 10a and 10b from each other, rarely cannot be performed by a human power due to foreign matters such as particles of sand which enter into gaps between the couplers 10a and 10b while they are coupled with each other. In such a case, an appropriate tool is engaged with the engagement grooves 20 on the outer peripheral surface of each of the couplers 10a and 10b, and the above-described movements of the couplers 10a and 10b along the longitudinal center lines and the above-described rotations of the couplers 10a and 10b, which are required to separate the couplers 10a and 10b from each other, can be forcibly performed by using the appropriate tool.

Each of the pair of conventional couplers 10a and 10b as described above has a simple structure, and the conventional couplers 10a and 10b facilitate an operation for coupling them with each other and an operation for releasing the coupling of them. If the rode-like member or the tubular member fixed to the coupling main body 12 is constituted of a material like that of the fire hose 28 which absorbs a certain degree of rotational force loaded thereto, the coupling of the couplers 10a and 10b is maintained by the urging forces of the urging units 18 even when the rotational force is loaded to the rod-like member or the tubular member while the couplers 10a and 10b are coupled with each other and the pressurized water is not supplied to the tubular member.

However, if the rod-like member or the tubular member is not constituted of a material like the fire hose 28 which absorbs a certain degree of rotational force loaded thereto, the coupling of the couplers 10a and 10b may be released when a rotational force larger than the urging forces of the urging units 18 is loaded on the rod-like member, or when the rotational force larger than the urging forces of the urging units 18 is loaded on the tubular member while the pressurized fluid is not supplied to the tubular member.

This invention is derived from these circumstances, and an object of this invention is to provide a coupling apparatus including a release preventing structure, in which: a pair of couplers are coaxially arranging and then are moved closer to each other so that the couplers are rotated relative to each other in their circumferential directions and are coupled with each other in a direction along longitudinal center lines thereof along which the couplers are separated from each other, by urging forces of urging units, when the pair of couplers are coupled with each other, as in the conventional coupling apparatus according to the above described patent; and the couplers coupled with each other are moved closer to each other and are rotated relative to each other oppositely in their circumferential directions against the urging forces of urging units, when the coupling of the couplers with each other are released, also as in the conventional coupling apparatus according to the above described patent: and further in which the coupling of the couplers with each other is surely prevented from releasing even when a rotational force which is greater than the urging forces of the urging units is loaded to at least one of the couplers while the couplers are coupled with each other.

BRIEF SUMMARY OF THE INVENTION

According to a first aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, the liner in at least one coupling main body is linearly movable along the longitudinal center line of the at least one coupling main body with respect to the at least one coupling main body by a rotation of the at least one coupling main body, the liner in the at least one coupling main body being fixed to a fixing member on a side of the liner opposing to the other coupling main body, and the liner in the other coupling main body is coupled with a member which is to be coupled with another fixing member on a side of the liner opposing to the at least one coupling main body.

According to a second aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member is provided on at least one of the pair of coupling main bodies so that the release preventing member is movable in a circumferential direction of the at least one coupling main body between a release position and a release preventing position, the release preventing member at the release preventing position comes into contact with at least one of the projecting portions of the other coupling main body while the coupling main bodies are coupled with each other, so that contact pressures between the engagement surfaces of engagement pieces of the projecting portions of one coupling main body and the engagement surfaces of the engagement pieces of the projecting portions of the other coupling main body in a direction along which the coupling main bodies are separated from each other are increased to prevent rotations of the coupling main bodies relative to each other for releasing the coupling of the coupling main bodies with each other, and the release preventing member at the release position releases the contact with respect to the at least one of the projecting portions of the other coupling main body while the coupling main bodies are coupled with each other, so that the release preventing member allows the rotations of the coupling main bodies relative to each other for releasing the coupling of the coupling main bodies with each other.

According to a third aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member using a leaf spring is provided on at least one of the coupling main bodies, the release preventing member being movable between a release position and a release preventing position and being urged to the release preventing position by an elastic force of the leaf spring, the release preventing member at the release preventing position is inserted into at least one of gaps between the other side surfaces of the projecting portions of one coupling main body the other side surfaces opposing to the side surfaces on which the engaging pieces are provided on the one coupling main body, and the other side surfaces of the projecting portions of the other coupling main body, the other side surfaces opposing to the side surfaces on which the engaging pieces are provided on the other coupling main body, while the coupling main bodies are coupled with each other, and prevents rotations of the coupling main bodies relative to each other for releasing the coupling of the coupling main bodies with each other, and the release preventing member is removed from the at least one gap when the release preventing member is moved from the release preventing position to the release position against the elastic force of the leaf spring, and allows the rotations of the coupling main bodies relative to each other for releasing the coupling of the coupling main bodies with each other.

According to a fourth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member which is screwed in at least one of the coupling main bodies, the release preventing member being movable forwards or rearwards between a release position and a release preventing position by the rotation of the release preventing member in one direction or in the other direction, the release preventing member at the release preventing position protrudes into at least one of the indents between the projecting portions of at least one of the coupling main bodies while the coupling main bodies are coupled with each other, and pushes at least one of the projecting portions of the other coupling main body inserted into the at least one indent to increase contact pressures between the engagement surfaces of the engagement pieces of the projecting portions of one coupling main body and the engagement surfaces of the engagement pieces of the projecting portions of the other coupling main body in a direction along which the coupling main bodies are separated from each other, thereby preventing rotations of the coupling main bodies for releasing the coupling of the coupling main bodies with each other, and the release preventing member at the release position releases the contact of the release preventing member with respect to the at least one of the projecting portions of the other coupling main body while the coupling main bodies are coupled with each other, and allows rotations of the coupling main bodies for releasing the coupling of the coupling main bodies with each other.

According to a fifth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member is provided on at least one of the coupling main bodies, the release preventing member being movable in a circumferential direction of the at least one of the coupling main bodies between a release position and a release preventing position, the release preventing member at the release preventing position is interposed in a gap between a bottom surface of at least one of the plurality of indents between the projecting portions of one of the coupling main bodies and a projecting end of at least one of the projecting portions of the other coupling main body, the projecting end corresponding to the bottom surface, while the coupling main bodies are coupled with each other, and prevents movements of the coupling main bodies in a direction along which the coupling main bodies approach each other so that the engagement of the engagement surfaces of the projecting portions of one coupling main body with the engagement surfaces of the projecting portions of the other coupling main body are released, thereby preventing rotations of the coupling main bodies for releasing the coupling of the coupling main bodies with each other, and the release preventing member at the release position is removed from the gap and allows the movements of the coupling main bodies in the direction along which the coupling main bodies approach each other and the rotations of the coupling main bodies for releasing the coupling of the coupling main bodies with each other.

According to a sixth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member is provided on the at least one of the coupling main bodies, the release preventing member being movable between a release position and a release preventing position along the longitudinal center line of the at least one of the coupling main bodies, the release preventing member at the release preventing position is inserted into at least one of gaps between the other side surfaces of the projecting portions of one coupling main body, the other side surfaces opposing to the side surfaces on which the engaging pieces are provided on the one coupling main body, and the other side surfaces of the projecting portions of the other coupling main body, the other side surfaces opposing to the side surfaces on which the engaging pieces are provided on the other coupling main body, while the coupling main bodies are coupled with each other, and prevents rotations of the coupling main bodies relative to each other for releasing the coupling of the coupling main bodies with each other, and the release preventing member is removed from the at least one gap when the release preventing member is moved from the release preventing position to the release position, and allows the rotations of the coupling main bodies relative to each other for releasing the coupling of the coupling main bodies with each other.

According to a seventh aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member is provided on at least one of the coupling main bodies, the release preventing member being rotational between a release position and a release preventing position, the release preventing member at the release preventing position is inserted into at least one of gaps between the other side surfaces of the projecting portions of one coupling main body, the other side surfaces opposing to the side surfaces on which the engaging pieces are provided on the one coupling main body, and the other side surfaces of the projecting portions of the other coupling main body, the other side surfaces opposing to the side surfaces on which the engaging pieces are provided on the other coupling main body, while the coupling main bodies are coupled with each other, and prevents rotations of the coupling main bodies relative to each other for releasing the coupling of the coupling main bodies with each other, and the release preventing member is removed from the at least one gap when the release preventing member is rotated from the release preventing position to the release position, and allows the rotations of the coupling main bodies relative to each other for releasing the coupling of the coupling main bodies with each other.

According to an eighth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a first coupling element is provided on an outer peripheral surface of each of the coupling main bodies, a release preventing member is provided on at least one of the coupling main bodies, the release preventing member having a second coupling element which can be coupled with the first coupling element, and being movable between a release preventing position at which the second coupling element is coupled with the first coupling element and a release position at which a coupling of the second coupling element with the first coupling element is released, the release preventing member at the release preventing position restricts rotations of the coupling main bodies relative to each other for releasing the coupling of the coupling main bodies with each other, while the coupling main bodies are coupled with each other, and the release preventing member at the release position allows the rotations of the coupling main bodies relative to each other for releasing the coupling of the coupling main bodies with each other.

According to a ninth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a band-shaped release preventing member is provided on at least one of the coupling main bodies, the release preventing member being movable between a release position and a release preventing position, and having a release preventing projection, the release preventing member at the release preventing position is arranged along an outer peripheral surface of at least one of the coupling main bodies, inserts the release preventing projection into at least one of gaps between the other side surfaces of the projecting portions of one coupling main body, the other side surfaces opposing to the side surfaces on which the engaging pieces are provided on the one coupling main body, and the other side surfaces of the projecting portions of the other coupling main body, the other side surfaces opposing to the side surfaces on which the engaging pieces are provided on the other coupling main body, while the coupling main bodies are coupled with each other, and prevents rotations of the coupling main bodies relative to each other for releasing the coupling of the coupling main bodies with each other, and the release preventing member is separated from the outer peripheral surface of the at least one of the coupling main bodies, removes the release preventing projection from the at least one gap when the release preventing member is moved from the release preventing position to the release position, and allows the rotations of the coupling main bodies relative to each other for releasing the coupling of the coupling main bodies with each other.

According to a tenth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, the coupling apparatus further comprises holder members each of which holds each coupling main body and each liner, the holder member holds the coupling main body to be capable of rotating and holds the liner to be movable along the longitudinal center line of the coupling main body, the coupling main body is capable of rotating with respect to the liner, a rotational movement/linear movement converting mechanism which moves the liner along the longitudinal center line by a rotation of the coupling main body in one direction or the other direction is interposed between the coupling main body and the liner, an urging mechanism which urges the liner in a direction opposing to a protruding direction of each of the projecting portions of the coupling main body is interposed between the liner and the holder member, and a selective rotation stop mechanism which selectively stops the rotation of the coupling main body is further interposed between the holder member and the liner.

According to an eleventh aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, the coupling apparatus further comprises holder members each of which holds each coupling main body and each liner, the holder member holds the coupling main body to be capable of rotating, and has a release preventing member which moves between a release preventing position and a release position in a circumferential direction of the coupling main body with a rotation of the coupling main body relative to the holder member, the release preventing member at the release preventing position is interposed in a gap between a bottom surface of at least one of the plurality of indents between the projecting portions of one of the coupling main bodies and a projecting end of at least one of the projecting portions of the other coupling main body, the projecting end corresponding to the bottom surface, while the coupling main bodies are coupled with each other, and prevents movements of the coupling main bodies in a direction along which the coupling main bodies approach each other so that the engagement of the engagement surfaces of the projecting portions of one coupling main body with the engagement surfaces of the projecting portions of the other coupling main body are released, thereby preventing rotations of the coupling main bodies for releasing the coupling of the coupling main bodies with each other, the release preventing member at the release position is removed from the gap and allows the movements of the coupling main bodies in the direction along which the coupling main bodies approach each other and the rotations of the coupling main bodies for releasing the coupling of the coupling main bodies with each other, an urging mechanism is interposed between the holder member and the coupling main body, and the urging mechanism urges the coupling main body to rotate the coupling main body with respect to the holder member in such a manner that the release preventing member of the holder member moves to the release position.

According to a twelfth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member using a leaf spring is provided on at least one of the coupling main bodies, the release preventing member being movable between a release position and a release preventing position and being urged to the release preventing position by an elastic force of the leaf spring, the release preventing member includes a release preventing protrusion, the release preventing member at the release preventing position is arranged along an outer peripheral surface of at least one of the coupling main bodies, inserts the release preventing projection into at least one of gaps between the other side surfaces of the projecting portions of one coupling main body, the other side surfaces opposing to the side surfaces on which the engaging pieces are provided on the one coupling main body, and the other side surfaces of the projecting portions of the other coupling main body, the other side surfaces opposing to the side surfaces on which the engaging pieces are provided on the other coupling main body, while the coupling main bodies are coupled with each other, and prevents rotations of the coupling main bodies relative to each other for releasing the coupling of the coupling main bodies with each other, and the release preventing member is separated from the outer peripheral surface of the at least one of the coupling main bodies, removes the release preventing projection from the at least one gap when the release preventing member is moved from the release preventing position to the release position, and allows the rotations of the coupling main bodies relative to each other for releasing the coupling of the coupling main bodies with each other.

According to a thirteenth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member is provided on at least one of the coupling main bodies, the release preventing member being movable between a release position and a release preventing position along the longitudinal center line of the at least one of the coupling main bodies, an urging mechanism which urges the release preventing member toward the release preventing position and an operation mechanism which selectively moves the release preventing member to the release position against an urging force of the urging mechanism are provided on the at least one coupling main body, the release preventing member at the release preventing position protrudes into at least one of the plurality of indents between the plurality of projecting portions of one coupling main body along the longitudinal center line of the one coupling main body, the release preventing member at the release position is retracted from the at least one of the indents, a release preventing recess is formed in a protruding end of at least one of the projecting portions of the other of the coupling main bodies, the at least one projecting portion of the other coupling main body corresponding to the at least one indent of the one coupling main body, and the release preventing recess receiving the release preventing member at the release preventing position and restricting rotations of the coupling main bodies relative to each other for releasing the coupling of the coupling main bodies with each other, and the release preventing member is removed from the release preventing recess when the release preventing member is moved from the release preventing position to the release position, and allows the rotations of the coupling main bodies relative to each other for releasing the coupling of the coupling main bodies with each other.

According to a fourteenth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a release preventing member is provided on at least one of the coupling main bodies, the release preventing member being movable between a release position and a release preventing position along the longitudinal center line of the at least one of the coupling main bodies, an urging mechanism which urges the release preventing member toward the release preventing position and an operation mechanism which selectively moves the release preventing member to the release position against an urging force of the urging mechanism are provided on the at least one coupling main body, the release preventing member at the release preventing position is projected into at least one of gaps between the other side surfaces of the projecting portions of one coupling main body, the other side surfaces opposing to the side surfaces on which the engaging pieces are provided on the one coupling main body, and the other side surfaces of the projecting portions of the other coupling main body, the other side surfaces opposing to the side surfaces on which the engaging pieces are provided on the other coupling main body, and the other side surfaces of the projecting portions of the other coupling main body, the other side surfaces opposing to the side surfaces on which the body, while the coupling main bodies are coupled with each other, and prevents rotations of the coupling main bodies relative to each other for releasing the coupling of the coupling main bodies with each other, and the release preventing member is removed from the at least one gap when the release preventing member is moved from the release preventing position to the release position, and allows the rotations of the coupling main bodies relative to each other for releasing the coupling of the coupling main bodies with each other.

According to a fifteenth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, at least one of the coupling main bodies can rotate with respect to the liner corresponding to the at least one coupling main body.

According to a sixteenth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, the liner in at least one of the coupling main bodies is linearly movable along the longitudinal center line of the at least one coupling main body with respect to the at least one coupling main body, a cam-shaped release preventing member which can rotate between a release preventing position and a release position and an operation mechanism which causes the cam-shaped release preventing member to rotate between the release preventing position and the release position are provided in the at least one coupling main body, the rotation of the cam-shaped release preventing member between the release preventing position and the release position linearly moves the liner accommodated in the at least one coupling main body, and a distance between a position of the liner accommodated in the at least one coupling main body along the longitudinal center line of the at least one coupling main body while the cam-shaped release preventing member is arranged at the release preventing position and a protruding end of each of the projecting portions of the at least one coupling main body is shorter than a distance between a position of the liner accommodated in the at least one coupling main body along the longitudinal center line of the at least one coupling main body while the cam-shaped release preventing member is arranged at the release position and the protruding end of each of the projecting portions of the at least one coupling main body.

According to a seventeenth aspect of the invention, a coupling apparatus including a release preventing structure comprises: a pair of cylindrical coupling main bodies which are concentrically and oppositely arranged to each other and have the same structure as to each other; and liners respectively accommodated in the coupling main bodies.

In this coupling apparatus, each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, and the projecting portions of one coupling main body are inserted into a plurality of indents between the projecting portions of the other coupling main body, and further the coupling main bodies are rotated relative to each other so that engagement surfaces of the projecting portions of one coupling main body face the engagement surfaces of the projecting portions of the other coupling main body to engage the engagement surfaces of the projecting portions of one coupling main body with the engagement surfaces of the projecting portions of the other coupling main body in a direction along which the pair of coupling main bodies are separated from each other.

Further, in this coupling apparatus, a rotary type release preventing member which can rotate in a plane crossing an outer surface of at least one of coupling main bodies between a release preventing position and a release position and an operation mechanism which causes the rotary type release preventing member to rotate between the release preventing position and the release position are provided in the at least one coupling main body, the rotary type release preventing member protrudes from a bottom surface of at least one of the indents of the at least one coupling main body into the at least one indent in a projecting direction of each of the projecting portions of the at least one coupling main body when the rotary type release preventing member is arranged at the release preventing position, and the rotary type release preventing member is retracted into the bottom surface of at least one of the indents of the at least one coupling main body when the rotary type release preventing member is arranged at the release position.

Additional objects and advantages of the Invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 7 is an enlarge view of a part of the release preventing ring of the release preventing structure shown in FIG. 5;

FIG. 8 is an enlarge view of a part of one coupler of a coupling apparatus including a release preventing structure and according to a third embodiment of the present invention, in which a release preventing lever of the release preventing structure performs a release preventing operation at a release preventing position;

FIG. 30 is an enlarged view of a part of a coupling apparatus including a release preventing structure and according to a thirteenth embodiment of the present invention;

FIG. 31 is an enlarged view of an operation member of a release preventing pin provided in one coupler of the coupling apparatus shown in FIG. 30;

FIG. 32 is a front view of a part of the other coupler of the coupling apparatus shown in FIG. 30, showing a release preventing pin accommodating recess provided in the other coupler;

FIG. 33 is an enlarged view of a part of a coupling apparatus including a release preventing structure and according to a fourteenth embodiment of the present invention;

DETAILED DESCRIPTION OF THE INVENTION

FIRST EMBODIMENT

A coupling apparatus including a release preventing structure according to a first embodiment of the present invention will be described with reference to FIGS. 1 to 3.

Figure 41:
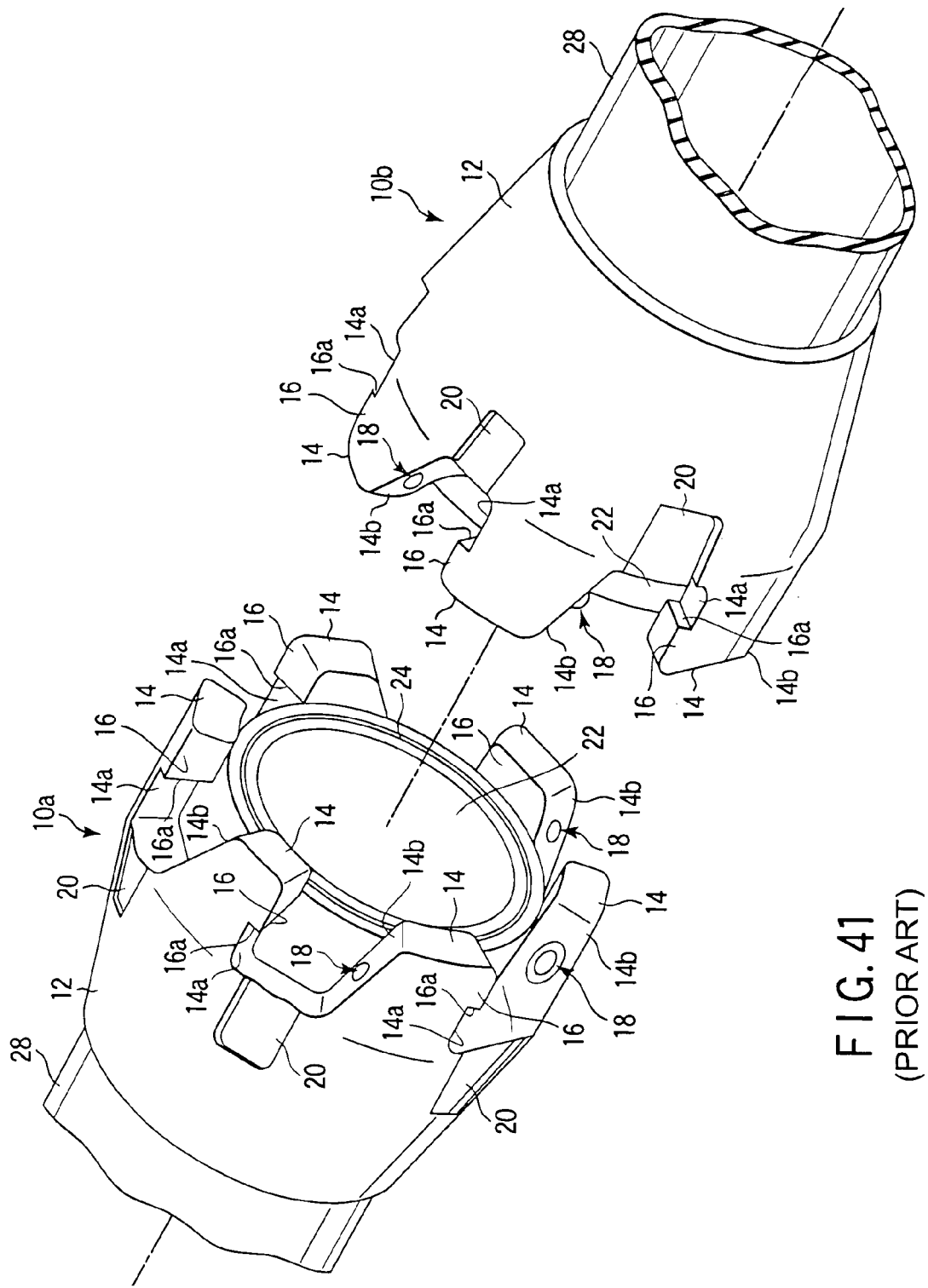
FIG. 41 is a perspective view showing a conventional coupling apparatus which is a base of the present invention, with a pair of couplers of the apparatus being separated from each other.
Figure 42:
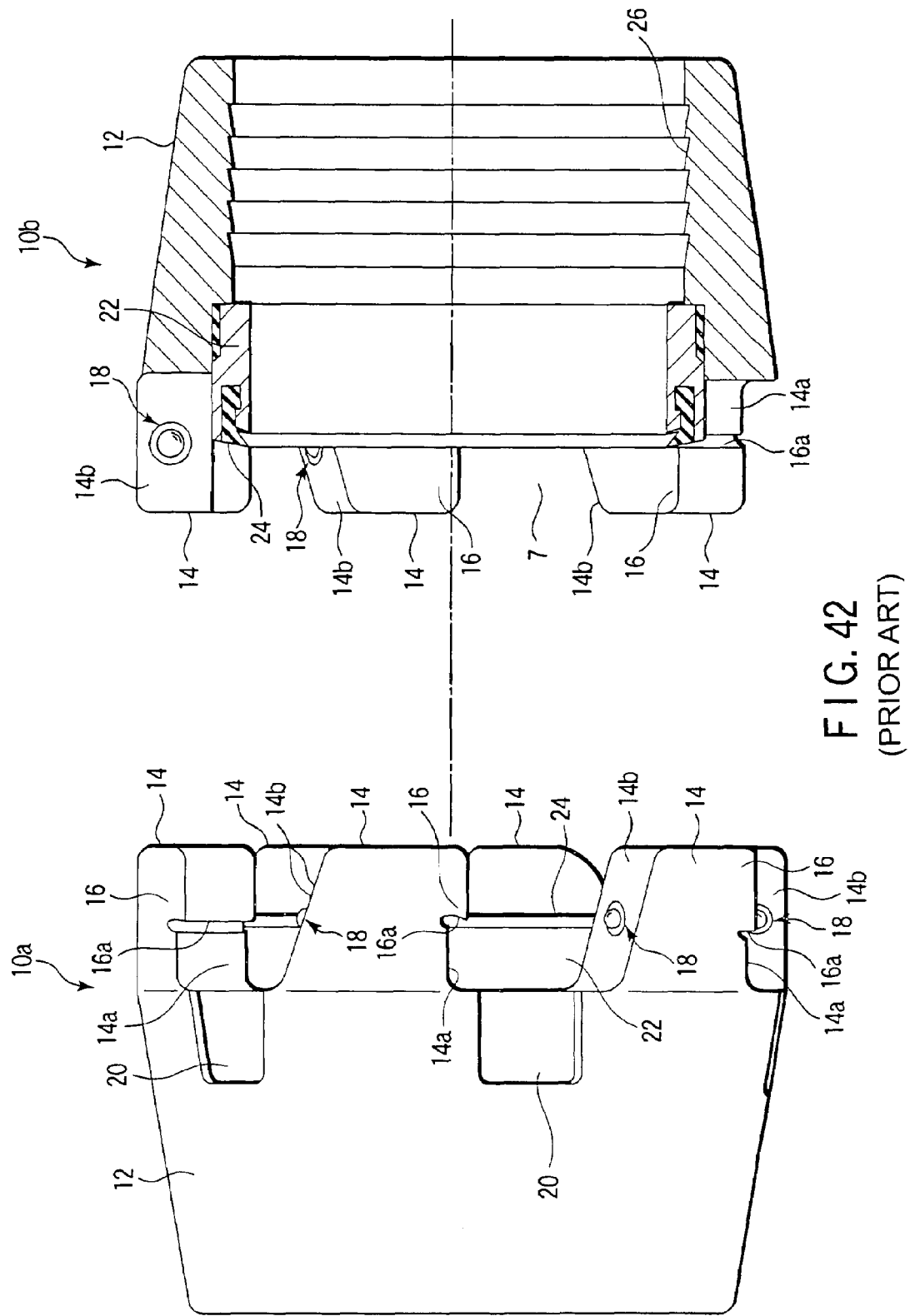
FIG. 42 shows a side view of one of the pair of couplers shown in FIG. 41 and a vertical cross-sectional view of the other coupler.
Figure 43:
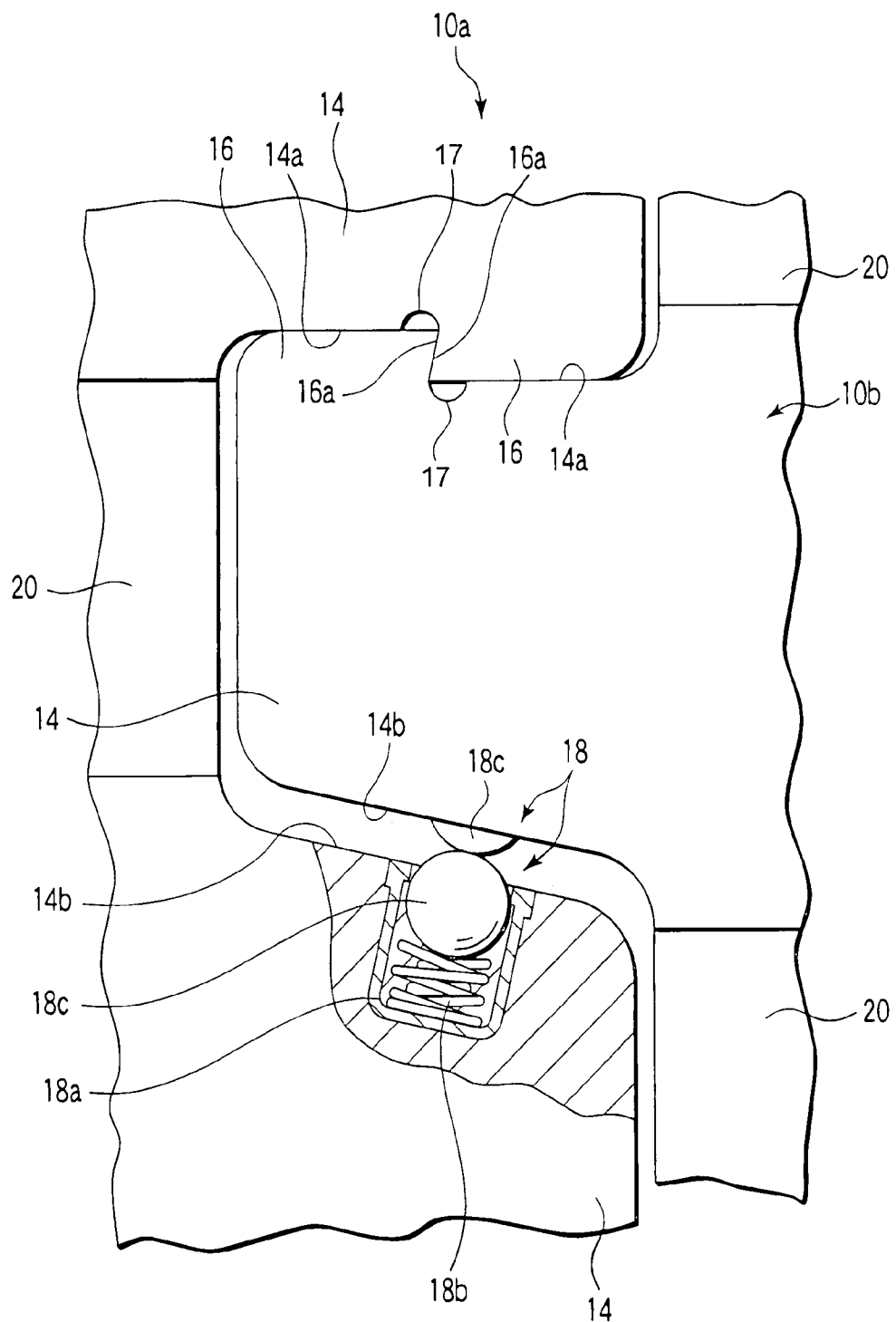
FIG. 43 is an enlarged view showing a part of the couplers coupled with each other, in which engagement pieces of the couplers engaged with each other and an urging mechanism for maintaining the coupling of the couplers coupled with each other are shown, and the urging mechanism is sectioned.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a pair of couplers 30a and 30b which are coupled with each other include coupling main bodies 12 having the same structure. In FIG. 1, engagement pieces 16 of a plurality of projecting portions 14 of one coupler 30a are engaged with engagement pieces 16 of a plurality of projecting portions 14 of the other coupler 30b, and the pair of couplings 30a and 30b are coupled with each other.

A cylindrical liner 32 of a release preventing structure accommodated in the coupling main body 12 of the one coupling 30a has a large-diameter portion 32a having a large diameter and positioned near to the plurality of projecting portions 14, and also has a small-diameter portion 32b having a small diameter and positioned away from the plurality of projecting portions 14. The large-diameter portion 32a can slide with respect to a part of an inner peripheral surface of the coupling main body 12 corresponding thereto in a circumferential direction thereof and along a longitudinal center line thereof, and the small-diameter portion 32b is screwed into a part of the inner peripheral surface of the coupling main body 12 corresponding thereto.

An outer end of the small-diameter portion 32b protruding from a side of the coupling main body 12 opposing to the plurality of projecting portions 14 is fixed to a fixing base 34a of a fixing member 34. In this embodiment, the fixing member 34 is, e.g., a casing of a pump, and the fixing base 34a is, e.g., a water discharge mouthpiece of a pump.

Therefore, the coupling main body 12 of the one coupler 30a is linearly moved in a direction away from the fixing base 34a or in a direction to get closer to the fixing base 34a along the longitudinal center line of the liner 32 when the coupling main body 12 is rotated in one direction or the other direction on the outer peripheral surface of the liner 32.

A knob 36 used to rotate the coupling main body 12 easily is attached on the outer peripheral surface of the coupling main body 12 of the one coupler 30a. A linear movement of the coupling main body 12 of the one coupler 30a in a direction toward the fixing base 34a is restricted when the coupling main body 12 of the one coupler 30a comes into contact with an end surface of the fixing base 34a facing the coupling main body 12 of the one coupler 30a, as shown in FIG. 2. Further, a linear movement of the coupling main body 12 of the one coupler 30a in a direction away from the fixing base 34a is restricted when a step of the inner peripheral surface of the coupling main body 12 of the one coupler 30a between a large diameter portion of the inner peripheral surface corresponding to the large-diameter portion 32a of the liner 32 and a small diameter portion of the inner peripheral surface corresponding to the small-diameter portion 32b of the liner 32 comes into contact with a step of the outer peripheral surface of the liner 32 between the large-diameter portion 32a and the small-diameter portion 32b, as shown in FIG. 1.

Figure 1:
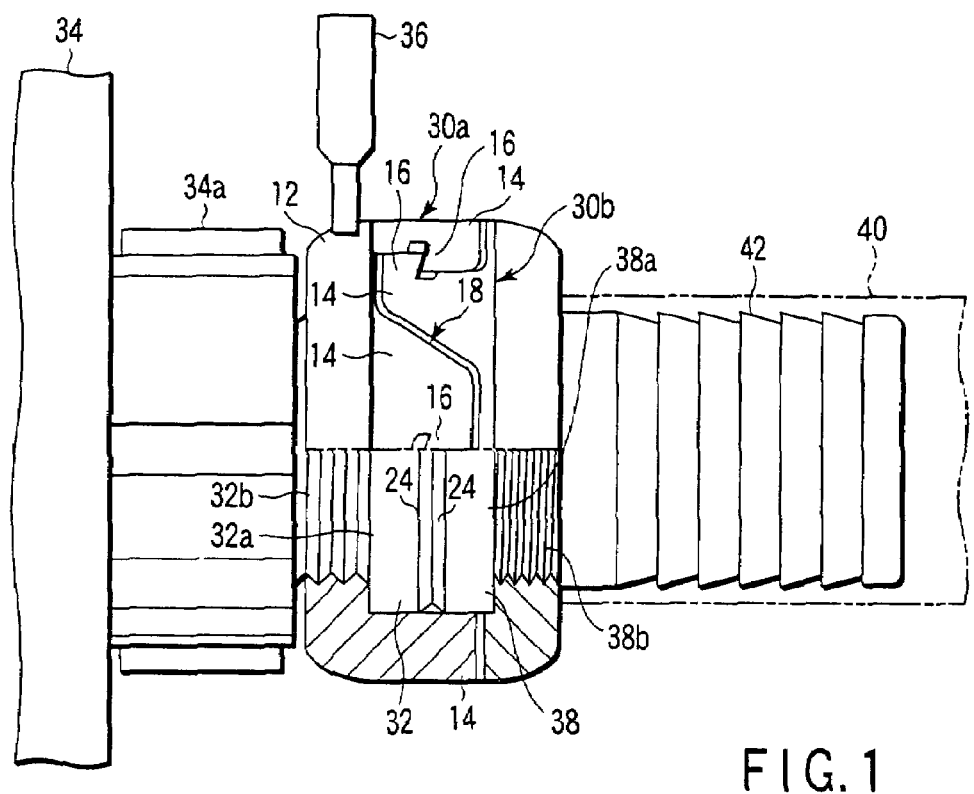
FIG. 1 is a half cross-sectional view of a coupling apparatus including a release preventing structure and according to a first embodiment of the present invention, in which a liner of the release preventing structure is not arranged at a release preventing position.
Figure 2:
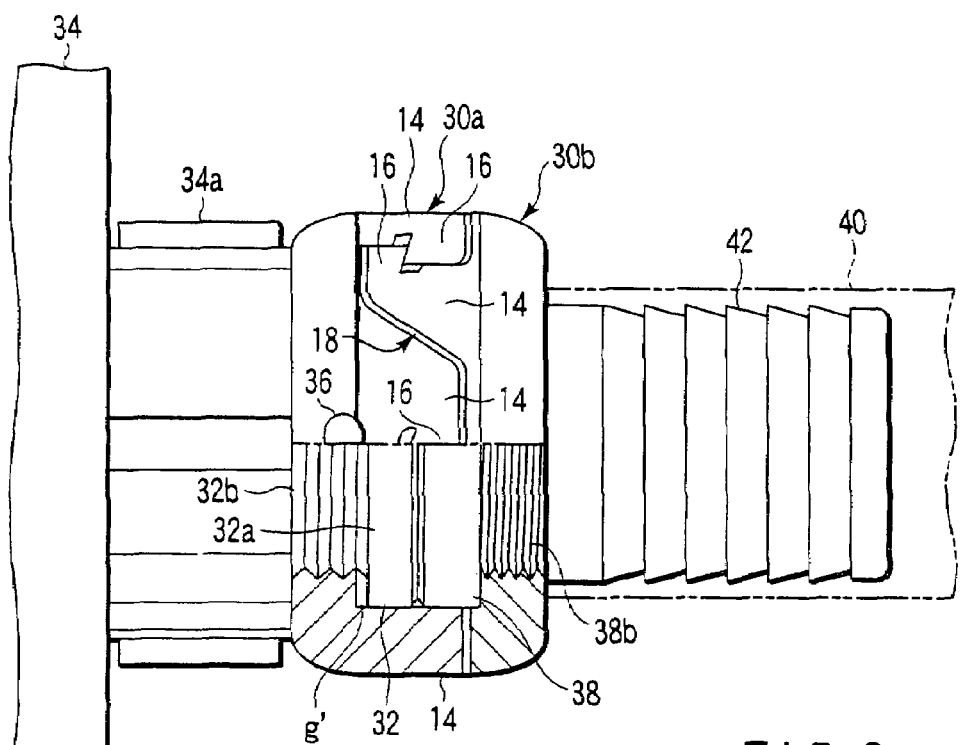
FIG. 2 is a half cross-sectional view showing the coupling apparatus including the release preventing structure and shown in FIG. 1 in a state that the liner of the release preventing structure is arranged at the release preventing position.
Figure 3:
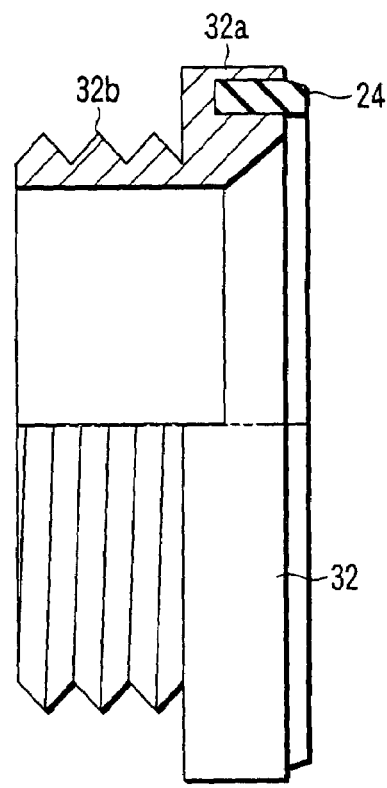
FIG. 3 is a half cross-sectional view of the liner of the release preventing structure shown in FIG. 1.

A position of the coupling main body 12 of the one coupler 30a when the coupling main body 12 is located farthermost from the fixing base 34a as shown in FIG. 1 is determined as a release position, and a position of the coupling main body 12 of the one coupler 30a when the coupling main body 12 is located closest to the fixing base 34a as shown in FIG. 2 is determined as a release preventing position.

A cylindrical liner 38 accommodated in the coupling main body 12 of the other coupler 30b also has a large-diameter portion 38a having a large-diameter and located near to the plurality of projecting portions 14 of the coupling main body 12 of the other coupler 30b and a small-diameter portion 38b having a small diameter and located away from the plurality of projecting portions 14. The large-diameter portion 38a can slide with respect to a part of an inner peripheral surface of the coupling main body 12 corresponding to the large-diameter portion 38a in the circumferential direction thereof and along the longitudinal center line thereof, and the small-diameter portion 38b is screwed in a part of the inner peripheral surface of the coupling main body 12 corresponding to the small-diameter portion 38b.

A fixing member 42 to which a member 40 to be coupled with the fixing base 34a of the fixing member 34 by the pair of couplers 30a and 30b is fixed to an outer end of the small-diameter portion 38b protruding outward from the coupling main body 12 in a direction opposing to the plurality of projecting portions 14. The fixing member 42 fixed to the outer end portion of the small-diameter portion 38b restricts a linear movement of the liner 38 with respect to the coupling main body 12 of the other coupler 30b along the longitudinal center line thereof and a rotation of the liner 38 with respect to the coupling main body 12 of the other coupler 30b in a circumferential direction thereof.

In this embodiment, the member 40 is an annular pipe. The pipe does not absorb almost all of a rotational force loaded on the member 40, and transmits almost all of the rotational force to the coupling main body 12 of the other coupler 30b.

While the coupling main body 12 of the one coupler 30a is located in the release position as shown in FIG. 1, only by coaxially arranging the other coupler 30b to the one coupler 30a and then approaching the other coupler 30b to the one coupler 30a in such a manner that the plurality of projecting portions 14 of the coupling main body 12 of the other coupler 30b are inserted into a plurality of indents between the plurality of projecting portions 14 of the coupling main body 12 of the one coupler 30a, the engagement pieces 16 of the plurality of projecting portions 14 of the coupling main body 12 of the other coupler 30b can be readily engaged with the engagement pieces 16 of the plurality of projecting portions 14 of the coupling main body 12 of the one coupler 30a like the coupling main bodies 12 of the pair of conventional couplers 10a and 10b described with reference to FIGS. 41 to 43. As a result, the pair of couplers 30a and 30b of this embodiment are coupled with each other as shown in FIG. 1, and the coupling of them is maintained by the urging forces of the urging units 18.

In this time, the annular seal member 24 on the protruding end of the large-diameter portion 38a of the liner 38 of the other coupler 30b is coaxially brought into contact with the annular seal member 24 on the protruding end of the large-diameter portion 32a of the liner 32 of the one coupler 30a, so that a gap therebetween is sealed. The annular seal members 24 being in contact with each other as described above can be further compressed due to their elasticity.

In order to release the above-described coupling of the pair of couplers 30a and 30b, like the coupling main bodies 12 of the pair of conventional couplers 10a and 10b as described above with reference to FIGS. 41 to 43, at first the coupling main bodies 12 of the pair of couplers 30a and 30b are moved to more close to each other against the urging forces of the urging units 18, and then they are rotated with respect to each other to separate the engagement pieces 16 of the plurality of projecting portions 14 of the coupling main body 12 of the other coupler 30b from the engagement pieces 16 of the plurality of projecting portions 14 of the coupling main body 12 of the one coupler 30a in the circumferential direction of each of the couplers 30a and 30b.

However, like the coupling of the coupling main bodies 12 of the pair of conventional couplers 10a and 10b with each other as described above with reference to FIGS. 41 to 43, the coupling of the coupling main bodies 12 of the pair of couplers 30a and 30b with each other while the coupling main body 12 of the one coupler 30a is arranged in the release position as shown in FIG. 1 is released in the following case. That is, in this case, a rotational force larger than the urging forces of the urging units 18 is loaded on the member 40 fixed to the fixing member 42 of the other coupler 30b in a direction opposite to that of the urging forces and the other coupler 30b is rotated with respect to the one coupler 30a against the urging forces of the urging units 18 while a pressurized fluid is not supplied in the liners 32 and 38 of the pair of couplers 30a and 30b and the annular seal members 34 of the liners 32 and 38 are not pressed against each other along the longitudinal center lines of the liners 32.

In order to avoid such a release of the coupling, in this first embodiment, the one coupler 30a is rotated on the liner 32 and is linearly moved from the release position shown in FIG. 1 to the release preventing position shown in FIG. 2 while the other coupler 30b is coupled with the one coupler 30a located in the release position as shown in FIG. 1. With this rotation of the one coupler 30a, the engagement pieces 16 of the plurality of projecting portions 14 of the coupling main body 1 of the one coupler 30a approach the engagement pieces 16 of the plurality of adjacent projecting portions 14 of the coupling main body 1 of the other coupler 30b in the circumferential direction of the one coupler 30a.

When the one coupler 30a is located in the release preventing position shown in FIG. 2, the one coupler 30a is closer to the fixing base 34a as compared with the case in which the one coupler 30a is located in the release position shown in FIG. 1. As a result, the liner 38 of the other coupler 30b, together with the one coupler 30a with which the other coupler 30b is coupled, moves along the longitudinal center line thereof to approach to the fixed liner 32 of the one coupler 30a, and the annular seal members 24 of the liners 32 and 38 strongly presses each other along the longitudinal center line. This results in strengthening the engagements of the engagement pieces 16 of the plurality of projecting portions 14 of the coupling main body 12 of the one coupler 30a with the engagement pieces 16 of the plurality of adjacent projecting portions 14 of the coupling main body 12 of the other coupler 30b in an axial direction along the longitudinal center line and in the circumferential direction thereof. Additionally, even if a rotational force larger than the urging forces of the urging units 28 is loaded to the member 40 fixed to the fixing member 42 of the other coupler 30b in the direction opposing to the direction of the urging forces of the urging units 18, the other coupler 30b is not rotated with respect to the one coupler 30a against the urging forces of the urging units 18, thereby preventing the release of the coupling of the pair of couplers 30a and 30b.

In order to release this coupling, it is only need to rotate the one coupler 30a on the liner 32 to make the one coupler 30a move from the release preventing position shown in FIG. 2 to the release position shown in FIG. 1.

Modification of First Embodiment

Figure 4:
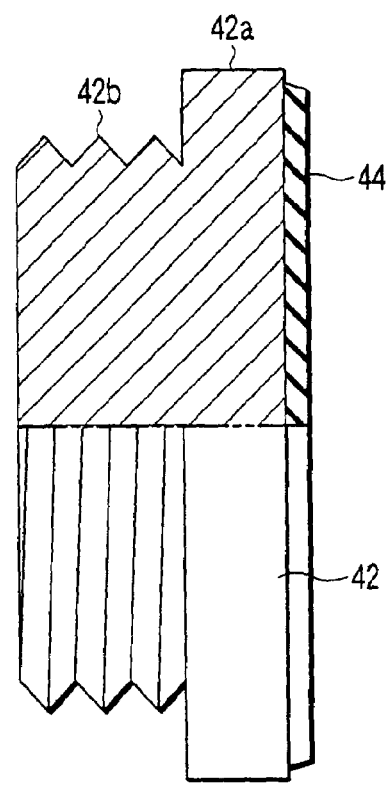
FIG. 4 is a half cross-sectional view of a modification of the liner of the release preventing structure shown in FIG. 1.

When there is no need to flow fluid through the member 40 fixed to the fixing member 42 of the other coupler 30b, at least one of the liner 32 of the one coupler 30a and the liner 38 of the other coupler 30b can be replaced with a liner 42 which has the same outer dimensions as those of the at least one of the liner 32 and the liner 38 and is solid as shown in FIG. 4, and an elastic member 44 formed of an elastic material may be fixed on an end surface of a large-diameter portion 42a of the liner 42, the end surface locating on a side of the liner 42 opposing a small-diameter portion 42b of the liner 42.

Incidentally, if there is no problem in sealing between the liner 32 of the one coupler 30a and the liner 38 of the other coupler 30b while the liner 32 is located in the release preventing position, the seal member 24 or the elastic member 44 may not be provided on each of the end surfaces of the large-diameter portions 32a and 42a of the liners 32 and 38.

SECOND EMBODIMENT

Figure 6:
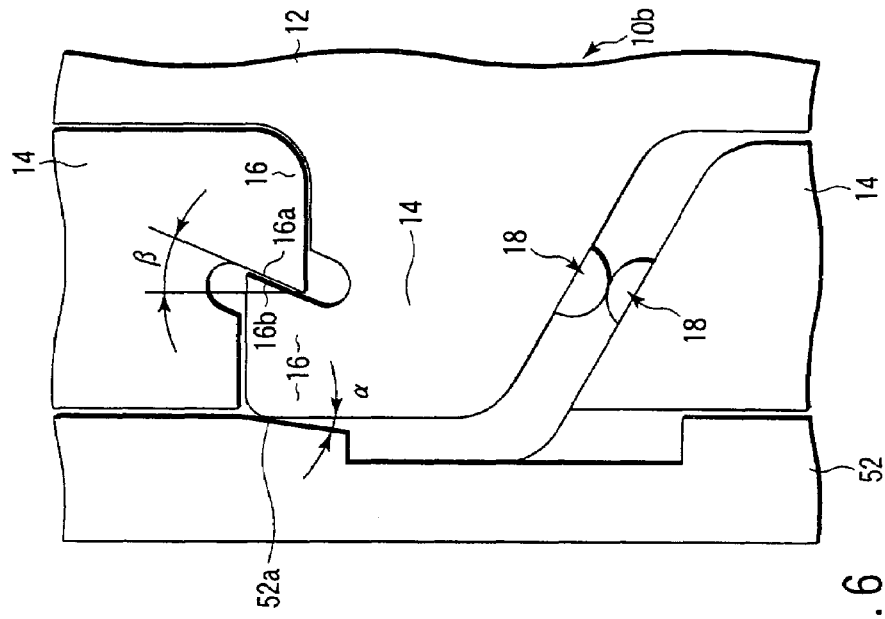
FIG. 6 is an enlarged view showing a part of the one coupler of the coupling apparatus including the release preventing structure and shown in FIG. 5 in a state that the release preventing ring of the release preventing structure performs a release preventing operation at the release preventing position.
Figure 5:
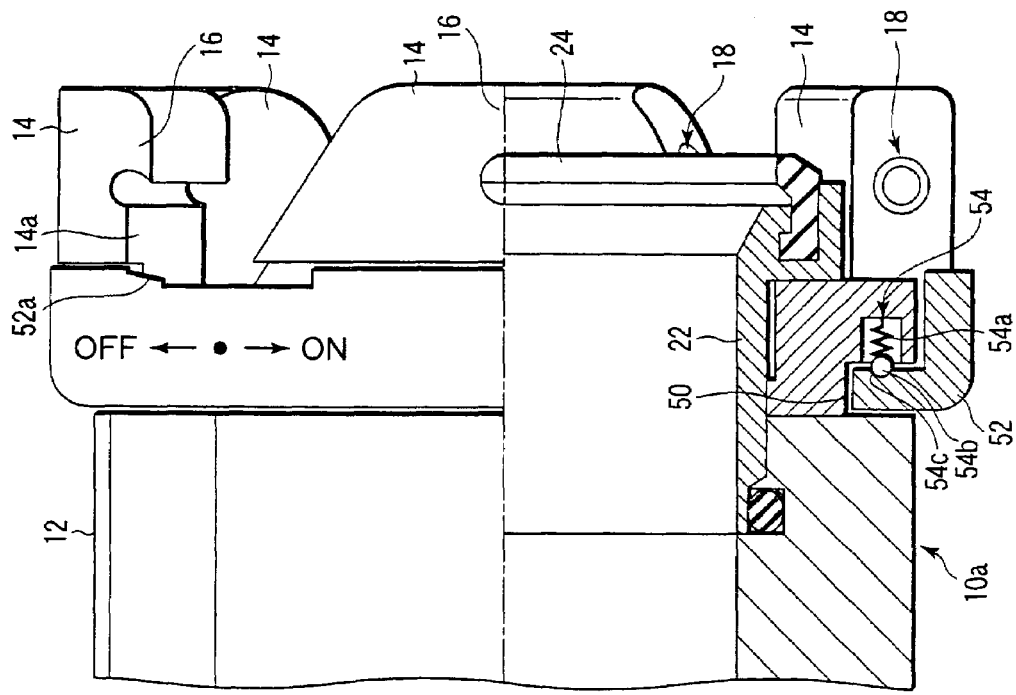
FIG. 5 is a half cross-sectional view of one coupler of a coupling apparatus including a release preventing structure and according to a second embodiment of the present invention, in which a release preventing ring of the release preventing structure is arranged at a release preventing position.

Next, a coupling apparatus including a release preventing structure and according to a second embodiment of the present invention will be described with reference to FIGS. 5 and 6.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, an annular groove 50 is formed on the outer peripheral surface of the coupling main body 12 of at least one of the pair of couplers 10a and 10b to be coupled with each other, and a ring-shaped release preventing member of a release preventing structure, i.e., a release preventing ring 52, is arranged in the annular groove 50 in such a manner that this ring can move in the circumferential direction of the coupling main body 12. Movement of the release preventing ring 52 in the circumferential direction is restricted within a predetermined range by a movement range restricting mechanism 54 interposed between the annular groove 50 on the outer peripheral surface of the coupling main body 12 and the release preventing ring 52. In this embodiment, the movement range restricting mechanism 54 is constituted by a ball-click mechanism. The ball-click mechanism comprises an urging means 54a like a compression coil spring set in the annular groove 50, a ball 54b urged by the urging means 54a toward a circumferentially extending surface of the release preventing ring 52 facing the ball 54b, a ball holding groove 54c formed into an arc shape with a predetermined length on the circumferential surface of the release preventing ring 52, and ball seats 54d provided at both ends of the ball holding groove 54c in its circumferentially extending direction. That is, the ball 54b urged by the urging means 54a rolls in the ball holding groove 54c while the release preventing ring 52 is rotated in its circumferential direction. And, when the ball 54b sits in one or the other of the two ball seats 54d, the release preventing ring 52 is located in its release preventing position or its release position.

The release preventing ring 52 extends along bottom surfaces of a plurality of indents between a plurality of projecting portions 14 of the coupling main body 12 of the one coupler 10a, and comprises a pressing surface 52a. The pressing surface 52a protrudes from at least one of bottom surfaces of the plurality of indents to a base end portion of the side surface 14a on which the engagement piece 16 is formed in the projecting portion 14 neighboring the at least one bottom surface as show in FIG. 5, when the release preventing ring 52 is located in the release preventing position. When the release preventing ring 52 is located in the release position, the pressing surface 52a is retracted in the at least one of the bottom surfaces of the plurality of indents, and allows the engagement and disengagement of the engagement pieces 16 of the plurality of projecting portions 14 of the coupling main body 12 of the other coupler 10b with and from the engagement pieces 16 of the plurality of projecting portions 14 of the coupling main body 12 of the one coupler 10a, i.e., the coupling and coupling release of the pair of couplers 10a and 10b with and from each other.

The pressing surface 52 is constituted by a convex arc shaped surface. And, when the release preventing ring 52 is located in the release preventing position, The pressing surface 52 is pressed on a part of the protruding end of at least one of projecting portions 14 of the coupling main body 12 of the other coupler 10b, the at least one projecting portion 14 being inserted in the at least one indent of the one coupler 10a while the pair of couplers 10a and 10b are coupled with each other, and the part neighboring the engagement piece 16 of the at least one projecting portion 14. At this time, an angle α formed between the pressing surface 52a and the above-described part of the protruding end of the at least one projecting portion 14 which is in contact with the pressing surface 52a is set within a range between 2° and 3°. This angle α is far smaller than an angle β by which each of the engagement surfaces 16a of the engagement pieces 16 of the plurality of projecting portions 14 of the coupling main body 12 of the one coupler 10a and those of the other coupler 10b coupled with the one coupler 10a is inclined to a circumferential line extending along the circumferential direction of the coupling main body 12 of the one coupler 10a.

Therefore, the pressing surface 52a of the release preventing ring 52 at the release preventing position pushes the pair of couplers 10a and 10b coupled with each other in a direction along which they are separated from each other, and prevents the rotations of the pair of couplers 10a and 10b for releasing the coupling of the couplers 10a and 10b with each other.

A friction increasing work such as knurling may be applied on an outer peripheral surface of the release preventing ring 52, and a tool engagement recess may be formed on the outer peripheral surface. A tool for forcibly rotating the release preventing ring 52 may be detachably engaged in the tool engagement recess.

Optionally, the release preventing ring 52 may be provided on an outer peripheral surface of the coupling main body 12 of the other coupler 10b, like in the one coupler 10b.

THIRD EMBODIMENT

Next, a coupling apparatus including a release preventing structure and according to a third embodiment of the present invention will be described with reference to FIGS. 8 to 10.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a release preventing lever 60 of a release preventing structure is provided on an outer peripheral surface of the coupling main body 12 of at least one of the pair of couplers 10a and 10b coupled with each other. The release preventing lever 60 is configured with a leaf spring. One end portion of the release preventing lever 60 is fixed by a fixing member 62 such as a fixing pin at a position adjacent to one of the button surfaces of the plurality of indents between the plurality of projecting portions 14 on the outer peripheral surface of the coupling main body 12 of the at least one coupler 10a. The other end portion of the release preventing lever 60 protrudes beyond the one bottom surface mentioned above into the one indent corresponding to the one bottom surface, and a protrusion 60a protruding in the one indent is formed at the other end portion. The protrusion 60a is arranged adjacent to a base region of the surface 14b on which the urging unit 18 is set on one protrusion 14 neighboring the one indent mentioned above. The protrusion 60a is formed by curling the other end portion of the release preventing lever 60. An area which is far from the one bottom surface at the other end portion of the release preventing lever 60 is obliquely raised from the outer peripheral surface, and constitutes a raised portion 60b.

The release preventing lever 60 has an operating portion 60c which laterally protrudes and is located between the one end portion and the other end portion of the release preventing lever 60. A downward inclined groove 64 is formed in an area corresponding to the operating portion 60c on the outer peripheral surface of the at least one coupling main body 12. In more detail, the downward inclined groove 64 extends from a position separated from a base end of the operation portion 60 toward a protruding end to a position far away from the protruding end in the above-described area.

Figure 9:
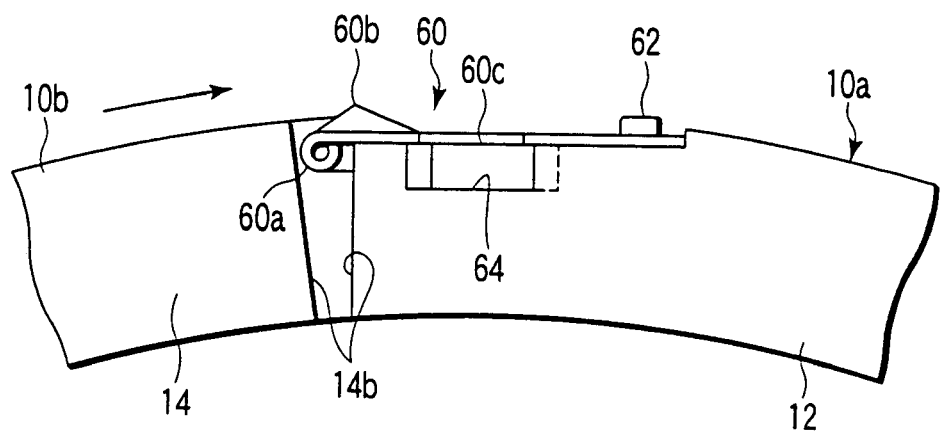
FIG. 9 is a cross-sectional view taken along a line IX-IX in FIG. 8.
Figure 10:
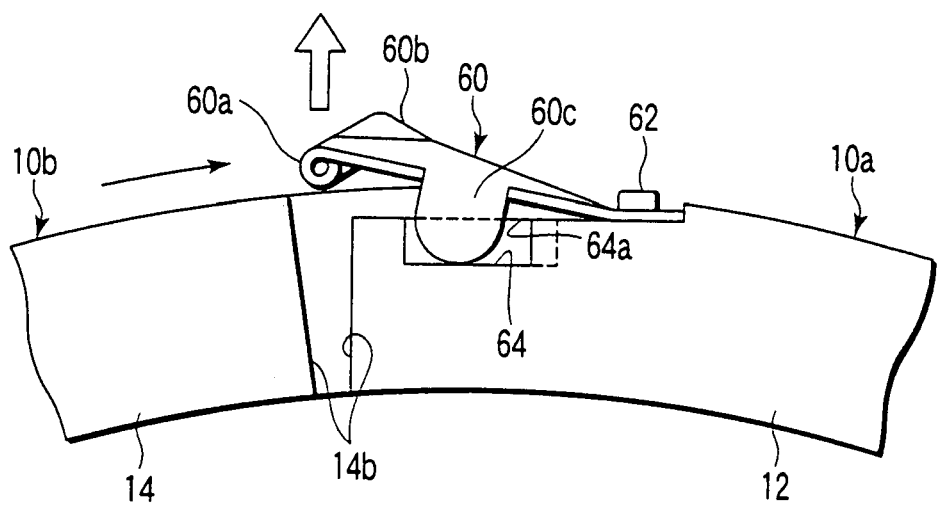
FIG. 10 is a cross-sectional view showing the release preventing lever of the release preventing structure and shown in FIG. 8 in a state that the release preventing lever is arranged at a release position.

As shown in FIGS. 8 and 9, the release preventing lever 60 is located in a release preventing position adjacent to the outer peripheral surface of the one coupling main body 12 by its own elasticity. When the protruding end portion of the operating portion 60c is pushed toward the downward inclined groove 64, a boundary 64a between an area corresponding to the operating portion 60c on the outer peripheral surface on which the operating portion 60c is laid and the downward inclined groove 64 functions as a supporting point for the operating portion 60c, and the other end portion of the release preventing lever 60 is lifted up in a direction away from the outer peripheral surface against the elasticity around the boundary 64a. As a result, the protrusion 60a of the other end portion moves out of the one indent. A position of the release preventing lever 60 at this time is a release position.

In order to couple the pair of couplers 10a and 10b with each other, when the pair of couplers 10a and 10b are concentrically arranged and are moved closer to each other so that the plurality of projecting portions 14 of the other coupler 10b are inserted into the plurality of indents between the plurality of projecting portions 14 of the one coupling 10a, one of protruding ends of the projecting portions 14 of the other coupler 10b corresponding to the one indent of the one coupler 10a collides with the lower surface of the raised portion 60b of the other end portion of the release preventing lever 60 located in the release preventing position. Then, the corresponding projecting portion 14 lifts up the other end portion of the release preventing lever 60 against its own elasticity and moves it to the release position shown in FIG. 10.

As a result, as indicated by a two-dots chain line in FIG. 8, the plurality of engagement pieces 16 of the plurality of projecting portions 14 of the one coupler 10a can be engaged with the plurality of engagement pieces 16 of the plurality of projecting portions 14 of the other coupler 10b. while the pair of couplers 10a and 10b are coupled with each other as described above, as indicated by the two-dots chain line in FIG. 8, gaps are produced between the side surfaces 14b located opposite to the engagement pieces 16 on the projecting portions 14 of the one coupler 10a and the side surface 14b located opposite to the engagement pieces 16 on the projecting portions 14 of the other coupler 10b. And, the protrusion 60a of the other end portion of the release preventing lever 60 falls in one of these gaps corresponding to the other end portion of the release preventing lever 60, and the release preventing lever 60 returns to the release preventing position by its own elasticity.

When the pair of couplers 10a and 10b coupled with each other are rotated relative to each other in order to release the coupling of the couplers 10a and 10b, the protrusion 60a of the other end portion of the release preventing lever 60 located in the release preventing position comes into contact with one of the side surfaces 14b located opposite to the engagement pieces 16 in the projecting portions 14 of the other coupler 10b and neighboring the protrusion 60a, as indicated by a solid line in FIG. 8, thereby preventing the rotations of the pair of couplers 10a and 10b for releasing the above described coupling.

In order to separate the pair of couplers 10a and 10b coupled with each other, from each other, the release preventing lever 60 must be moved to the release position by pushing the operation portion 60c of the release preventing lever 60, as described above with reference to FIG. 10.

Optionally, the release preventing lever 60 may be provided on the outer peripheral surface of the coupling main body 12 of the other coupler 10b like in the one coupler 10a, and any number of release preventing levers 60 may be provided on each of the pair of couplers 10a and 10b to correspond to any of the bottom surfaces of the indents in each of the couplers 10a and 10b.

FOURTH EMBODIMENT

Next, a coupling apparatus including a release preventing structure and according to a fourth embodiment will be described with reference to FIGS. 11 and 12.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, in one coupling 10a, a release preventing member 70 of a release preventing structure is provided on the one coupler 10a, and the release preventing member 70 can protrude from and retracted in at least one of the bottom surfaces of the plurality of indents between the plurality of projecting portions 14 of the coupling main body 12 of the one coupler 10a. The release preventing member 70 is screwed in the vicinity of the one bottom surface in the coupling main body 12. One end portion of the release preventing member 70 is positioned in the one bottom surface, and the other end portion thereof is exposed from the outer peripheral surface of the coupling main body 12. An operation lever 72 which makes easy to rotate the release preventing member 70 is attached to the exposed other end portion of the release preventing member 70.

Figure 11:
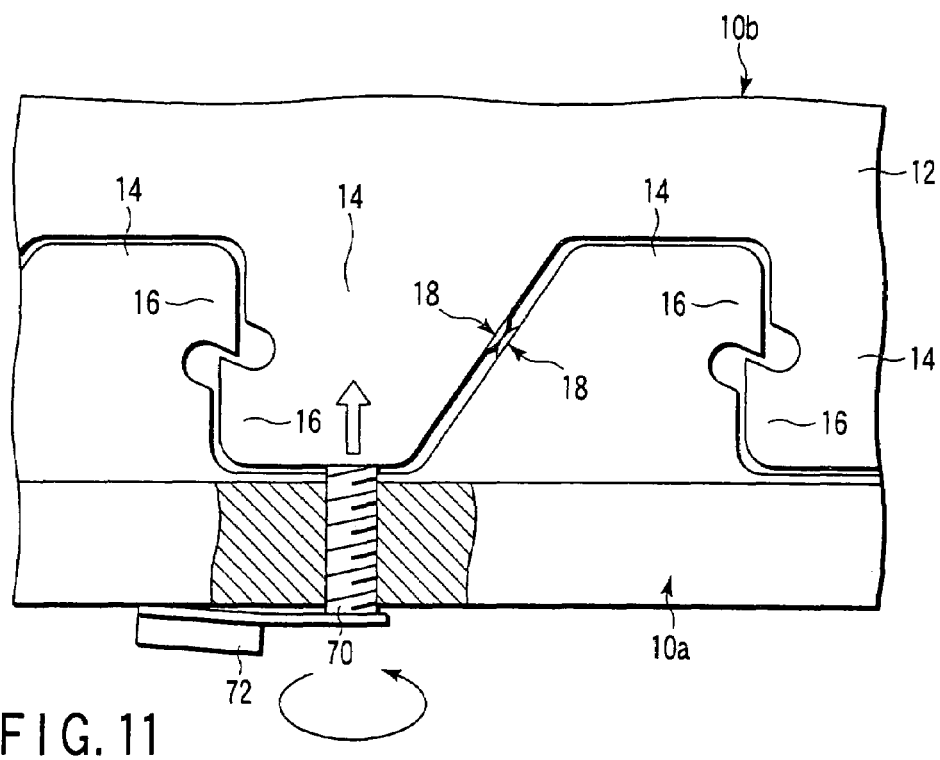
FIG. 11 is an enlarged view of a part of a coupling apparatus including a release preventing structure and according to a fourth embodiment of the present invention, in which a release preventing member of the release preventing structure is arranged at a release position.

When the release preventing member 70 is rotated in one direction by the operation lever 72, the release preventing member 70 is located in a release position where the one end portion thereof do not protrude from the one of bottom surfaces of the plurality of indents between the plurality of projecting portions 14 of the coupling main body 12 of the one coupler 10a, as shown in FIG. 11. Additionally, when the release preventing member 70 is rotated in the other direction by the operation lever 72, the release preventing member 70 is arranged at a release preventing position where the one end portion thereof protrudes from the one of the bottom surfaces of the plurality of indents between the plurality of projecting portions 14 of the coupling main body 12 of the one coupler 10a, as shown in FIG. 12.

While the release preventing member 70 is located in the release position as shown in FIG. 11, in order to couple the pair of couplers 10a and 10b with each other, the plurality of projecting portions 14 of the other coupler 10b can be inserted into the plurality of indents between the plurality of projecting portions 14 of the one coupler 10a by moving the pair of couplers 10a and 10b closer to each other in a state that they are concentrically arranged, and further the pair of couplers 10a and 10b can be rotated relative to each other in such a manner that the plurality of engagement pieces 16 of the plurality of projecting portions 14 of the one coupler 10a are engaged with the plurality of engagement pieces 16 of the plurality of projecting portions 14 of the other coupler 10b. On the contrary, the pair of couplers 10a and 10b coupled with each other are allowed to rotate relative to each other to separate the pair of couplers 10a and 10b coupled with each other from each other.

Figure 12:
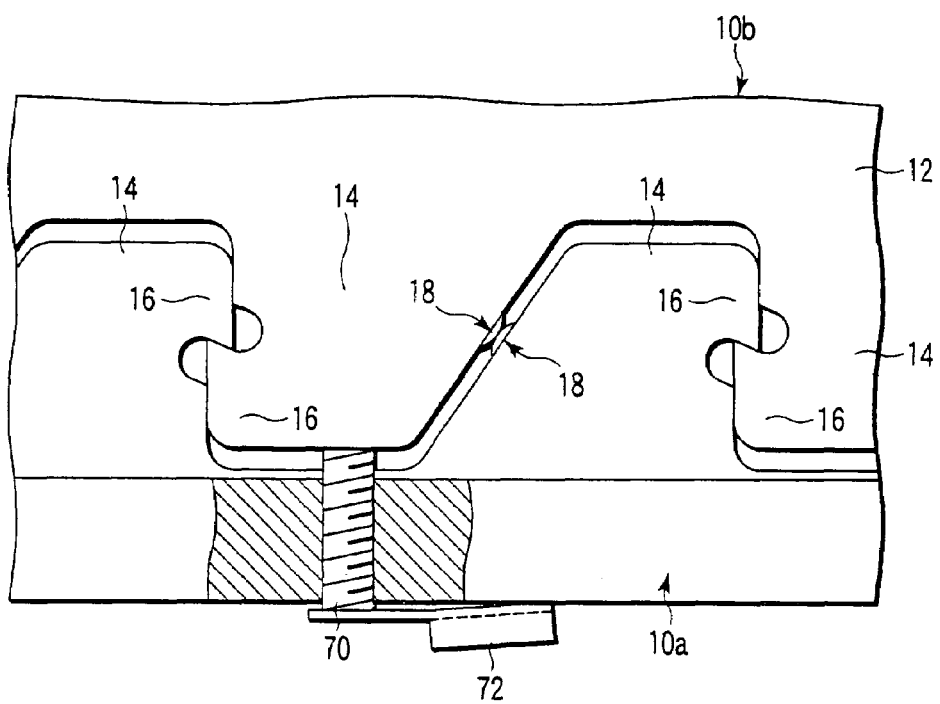
FIG. 12 is an enlarged view showing the part of the coupling apparatus including the release preventing structure and shown in FIG. 11 in a state that the release preventing member of the release preventing structure performs a release preventing operation at a release preventing position.

When the release preventing member 70 is located in the release preventing position while the pair of coupling members 10a and 10b are coupled with each other as shown in FIG. 12, the one end portion of the release preventing member 70 pushes one of protruding ends of the projecting portions 14 of the other coupler 10b corresponding to the one of bottom surfaces of the indents of the one coupler 10a, and moves the one of protruding ends of the projecting portions 14 of the other coupler 10b away from the one of bottom surfaces of the indents of the one coupler 10a.

As a result, engagements between the engagement pieces 16 of the plurality of projecting portions 14 of the coupling main body 12 of the one coupler 10a and the engagement pieces 16 of the plurality of projecting portions 14 of the coupling main body 12 of the other coupler 10b in the longitudinal direction and the circumferential direction of each of the couplers 10a and 10b is strengthened.

The release preventing member 70 may be provided in the other coupler 10a like in the one coupler 10a, and any number of release preventing members 70 may be provided at any positions corresponding to the bottom surfaces of the plurality of indents in each of the pair of couplers 10a and 10b.

FIFTH EMBODIMENT

Next, a coupling apparatus including a release preventing structure according to a fifth embodiment of the present invention will be described with reference to FIG. 13.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, an annular groove 80 is formed in an outer peripheral surface of the coupling main body 12 of at least one of the pair of couplers 10a and 10b to be coupled with each other, and a ring-shaped release preventing member of a release preventing structure, i.e., a release preventing ring 82 is arranged in the annular groove 80 in such a manner that it can move in the circumferential direction of the coupling main body 12. Movement of the release preventing ring 82 in the circumferential direction is restricted in a predetermined range by a movement range restricting groove 84 formed adjacent to the annular groove 80 in the outer peripheral surface of the coupling main body 12 mentioned above.

The annular groove 80 extends along the bottom surfaces of the plurality of indents between the plurality of projecting portions 14 of the coupling main body 12 of the one coupler 10a. The movement range restriction groove 84 is formed at a base of at least one of the projecting portions 14 of the one coupler 10a, and one end of the movement range restriction groove 84 in the circumferential direction is opened in the side surface 14b located opposite to the side surface 14a on which the engagement piece 16 is provided in the at least one protrusion 14 mentioned above.

The release preventing ring 82 comprises a release preventing protrusion 82a which is movable in the circumferential direction between a release position where the release preventing protrusion 82a is retracted in the movement range restriction groove 84 and a release preventing position where the release preventing protrusion 82a protrudes from the circumferential opening of the movement range restriction groove 84 into one indent in which the movement range restriction groove 84 is opened. A friction increasing work, for example, knurling work or providing of a finger-hold projection 82b may be performed on the outer peripheral surface of the release preventing ring 82. Further, a tool engagement recess in which a tool is engaged to make easy to rotate the release preventing ring 82 may be formed.

While the release preventing protrusion 82a of the release preventing ring 82 is located in the release position in the movement range restriction groove 84, in order to couple the pair of couplers 10a and 10b with each other, the plurality of protrusions 14 of the other coupler 10b can be inserted into the plurality of indents between the plurality of projecting portions 14 of the one coupler 10a by moving the pair of couplers 10a and 10b closer to each other in a state that they are concentrically arranged, and further the pair of couplers 10a and 10b can be rotated relative to each other in such a manner that the plurality of engagement pieces 16 of the projecting portions 14 of the one coupler 10a are engaged with the plurality of engagement pieces 16 of the projecting portions 14 of the other coupler 10b. On the contrary, rotations of the pair of couplers 10a and 10b relative to each other for releasing the coupling of the pair of couplers 10a and 10b from each other are allowed.

Figure 13:
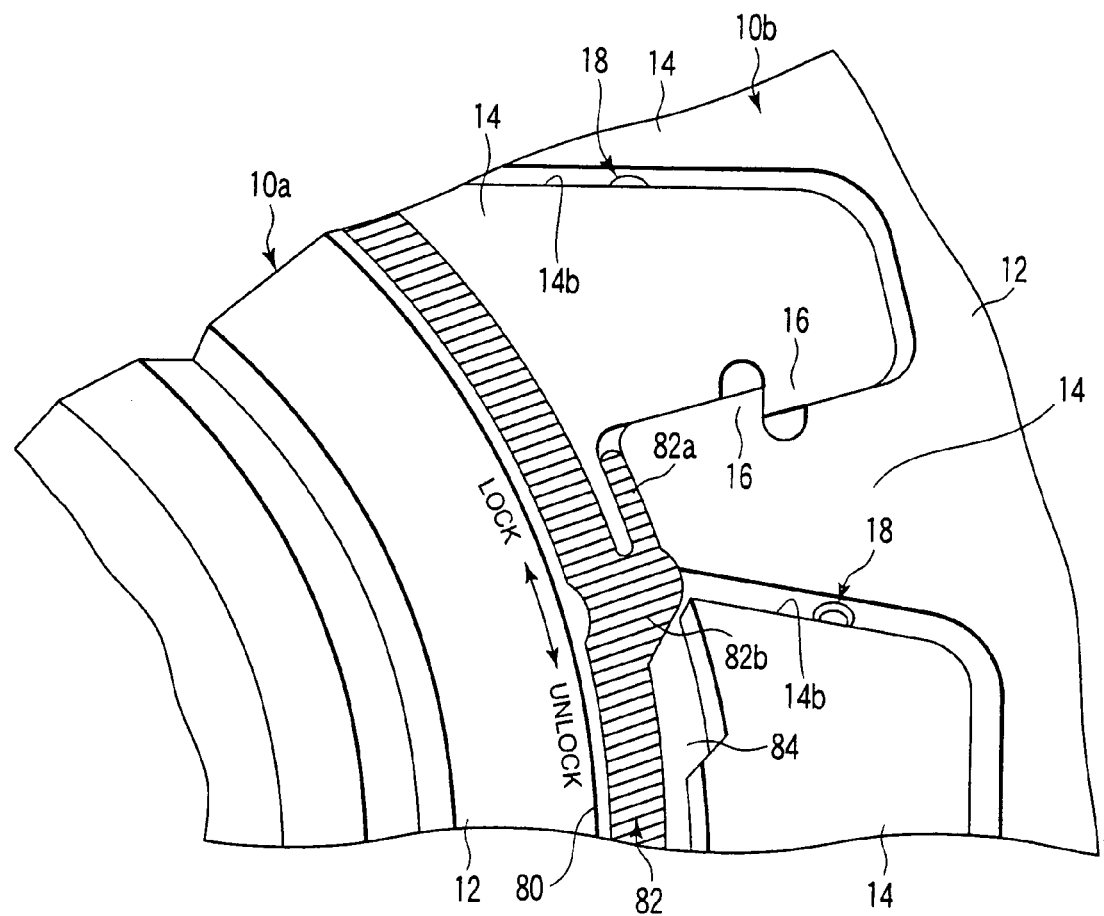
FIG. 13 is an enlarged perspective view of a part of a coupling apparatus including a release preventing structure and according to a fifth embodiment of the present invention, in which a release preventing ring of the release preventing structure performs a release preventing operation at a release preventing position.

When the release preventing protrusion 82a of the release preventing ring 82 is moved to the release preventing position while the pair of couplers 10a and 10b are coupled with each other, the release preventing protrusion 82a projects from the movement range restriction groove 84 into the one indent in which the movement range restriction groove 84 is opened, and the release preventing protrusion 82a is interposed between the bottom surface of the one indent and the protruding end of one of the projecting portions 14 of the other coupler 10b, the one projecting portion 14 being inserted in the one indent, as shown in FIG. 13.

As a result, it is impossible to move the pair of couplers 10a and 10b coupled with each other closer to each other in the longitudinal direction of each of the couplers 10a and 10b to release the engagements between the engagement pieces 16 of the projecting portions 14 of the coupling main body 12 of the one coupler 10a and the engagement pieces 16 of the projecting portions 14 of the coupling main body 12 of the other coupler 10b in the longitudinal direction. Therefore, the pair of couplers 10a and 10b coupled with each other can not be rotated relative to each other to release the coupling of the pair of couplers 10a and 10b with each other.

The release preventing ring 82 having the release preventing projection 82a may be provided on the other coupler 10a like on the one coupler 10a, and any number of release preventing projections 82a may be provided on the release preventing rings 82 at any positions corresponding to any bottom surfaces of the plurality of indents in each of the pair of couplers 10a and 10b.

SIXTH EMBODIMENT

Next, a coupling apparatus including a release preventing structure and according to a sixth embodiment of the present invention will be described with reference to FIGS. 14 and 15.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a slide type release preventing member 90 of a release preventing structure is provided on the outer peripheral surface of the coupling main body 12 of at least one of the pair of couplers 10a and 10b coupled with each other. The slide type release preventing member 90 is movable in the longitudinal direction of the at least one coupler 10a at a position adjacent to one of the bottom surfaces of the plurality of indents between the plurality of projecting portions 14 on the outer peripheral surface of the coupling main body 12 of the at least one coupler 10a. Movement of the slide type release preventing member 90 in the longitudinal direction is restricted within a predetermined range by a movement range restriction mechanism 92 interposed between the outer peripheral surface of the at least one coupling main body 12 mentioned above and the slide type release preventing member 90. In this embodiment, the movement range restriction mechanism 92 includes a guide member 92a which is fixed on the outer peripheral surface and extends in the longitudinal direction to cover an upper surface of the slide type release preventing member 90. A guide slot 92b extending in the longitudinal direction by a predetermined distance is formed in the guide member 92a, and an operating projection 90a formed on the upper surface of the slide type release preventing member 90 is inserted into the guide slot 92b. When the operating projection 90a is located in one end of the guide slot 92b in the extending direction thereof, the slide type release preventing member 90 is located in a release preventing position. And, when the operating projection 90a is located in the other end of the guide slot 92b in the extending direction thereof, the slide type release preventing member 90 is located in a release position.

The movement range restriction mechanism 92 further includes a ball-click mechanism interposed between the outer peripheral surface and the slide type release preventing member 90. The ball-click mechanism comprises an urging means 94a such as a compression coil spring set in the slide type release preventing member 90, a ball 94b urged toward the outer peripheral surface by the urging means 94a, and two ball seats 94c formed in the outer peripheral surface. When the slide type release preventing member 90 is arranged in the release preventing position and in the release position, the ball 94b is seated in one and the other of the two ball seats 94c. That is, when the ball 94b urged by the urging means 94a is seated in any one of the two ball seats 94c, the slide type release preventing member 90 is held in any one of the release preventing position and the release position.

When the slide type release preventing member 90 is located in the release position, one end portion 90b of the slide type release preventing member 90 positioned near to the bottom surface of the one indent does not protrude from the bottom surface into the one indent. In this time, in order to couple the pair of couplers 10a and 10b with each other, the plurality of projecting portions 14 of the other coupler 10b can be inserted into the plurality of indents between the plurality of projecting portions 14 of the one coupler 10a by moving the pair of couplers 10a and 10b closer to each other in a state that they are concentrically arranged, and the pair of couplers 10a and 10b can be rotated relative to each other to engage the plurality of engagement pieces 16 of the projecting portions 14 of the one couplers 10a with the plurality of engagement pieces 16 of the protrusions 14 of the other coupler 10b. On the contrary, rotations of the pair of couplers 10a and 10b relative to each other to release the coupling of the pair of couplers 10a and 10b with each other is allowed.

Figure 14:
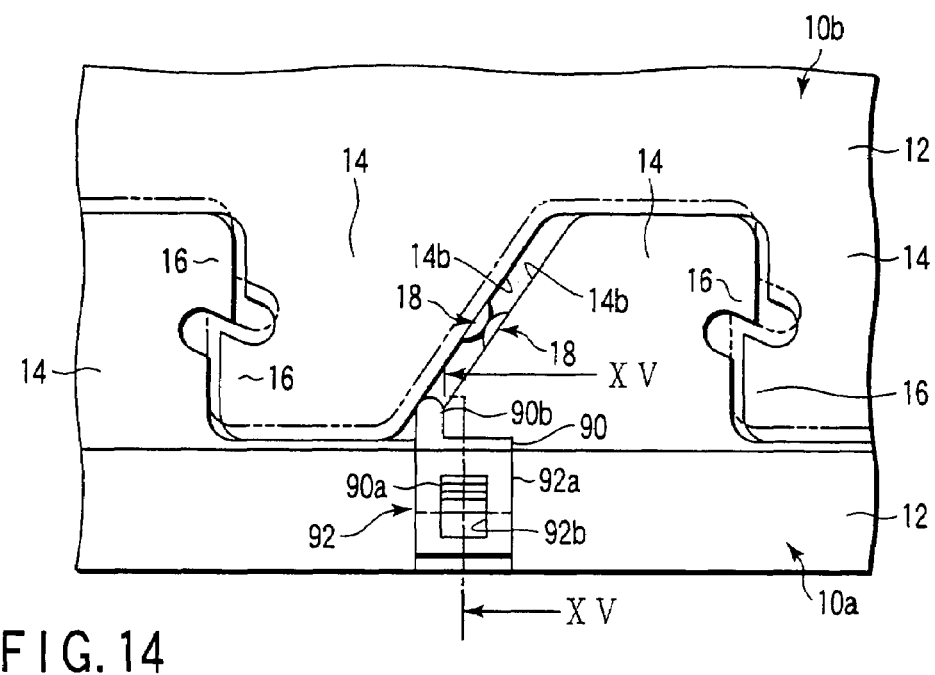
FIG. 14 is an enlarged view of a part of a coupling apparatus including a release preventing structure and according to a sixth embodiment of the present invention, in which a slide type release preventing member of the release preventing structure performs a release preventing operation at a release preventing position.
Figure 15:
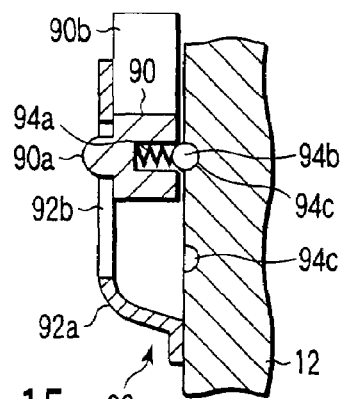
FIG. 15 is a cross-sectional view of the release preventing structure taken along a line XV-XV in FIG. 14.

When the slide type release preventing member 90 is moved to the release preventing position while the pair of couplers 10a and 10b are coupled with each other as indicated by a two-dots chain line in FIG. 14, the one end portion of the slide type release preventing member 90 protrudes beyond the bottom surface of the one indent corresponding to the slide type release preventing member 90 into the one indent as indicated by a solid line in FIG. 14. In more detail, while the pair of couplers 10a and 10b are coupled with each other as indicated by a two-dots chain line in FIG. 14, a gap is produced between the side surface 14b located opposite to the engagement piece 16 in one of the projecting portions 14 of the one coupler 10a and the side surface 14b located opposite to the engagement piece 16 in one of the projecting portions 14 of the other coupler 10b, the one projecting portion 14 of the one coupler 10a being neighboring the one projecting portion 14 of the other coupler 10a. And, the one end portion 90b of the slide type release preventing member 90 located in the release preventing position and projected in the one indent inserted in the gap corresponding to the one indent.

When the pair of couplers 10a and 10b coupled with each other are rotated to release the coupling of the pair of couplers 10a and 10b, the one end portion 90b of the slide type release preventing member 90 at the release preventing position comes into contact with the side surface 14b located opposite to the engagement piece 16 in the one projecting portion 14 of the other coupler 10b corresponding to the one indent of the one coupler 10*a*, thereby preventing the rotations of the pair of couplers 10*a* and 10*b* to release the coupling of the pair of couplers 10*a* and 10*b*.

In order to separate the pair of couplers 10*a* and 10*b* coupled with each other, the slide type release preventing member 90 is moved to the release position.

The slide type release preventing member 90 may be provided on the outer peripheral surface of the coupling main body 12 of the other coupler 10*b*, and any number of slide type release preventing members 90 may be provided on each of the pair of couplers 10*a* and 10*b* to correspond to any of the bottom surfaces of the plurality of indents of each of the pair of couplers 10*a* and 10*b*.

SEVENTH EMBODIMENT

Next, a coupling apparatus including a release preventing structure and according to a seventh embodiment of the present invention will be described with reference to FIGS. 16 and 17.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a rotary type release preventing member 96 of a release preventing structure is provided on the outer peripheral surface of the coupling main body 12 of at least one of the pair of couplers 10*a* and 10*b* coupled with each other. The rotary type release preventing member 96 can be rotated around a rotation center shaft 96*a* at a position adjacent to one of the bottom surfaces of the plurality of indents between the plurality of projecting portions 14 on the outer peripheral surface of the coupling main body 12 of the at least one coupler 10*a*. Rotation of the rotary type release preventing member 96 is restricted within a predetermined range by a rotation range restriction mechanism 98 interposed between the outer peripheral surface of the at least one coupling main body 12 mentioned above and the rotary type release preventing member 96. In this embodiment, the rotation range restriction mechanism 98 includes a ball-click mechanism interposed between the outer peripheral surface and the rotary type release preventing member 96. The ball-click mechanism comprises an urging means 98*a* such as a compression coil spring set in the rotary type release preventing member 96, a ball 98*b* urged toward the outer peripheral surface by the urging means 98*a*, and two ball seats 98*c* formed in the outer peripheral surface. When the rotary type release preventing member 96 is arranged in the release preventing position and in the release position, the ball 98*b* is seated in one and the other of the two ball seats 98*c*. That is, when the ball 98*b* urged by the urging means 98*a* is seated in any one of the two ball seats 98*c*, the rotary type release preventing member 96 is held in any one of the release preventing position and the release position.

A release preventing projection 96*b* is formed on an outer peripheral surface of the rotary type release preventing member 96. When the rotary type release preventing member 96 is located in the release position, the release preventing projection 96*b* of the rotary type release preventing member 96 does not protrude from the bottom surface into the one indent. In this time, in order to couple the pair of couplers 10*a* and 10*b* with each other, the plurality of projecting portions 14 of the other coupler 10*b* can be inserted into the plurality of indents between the plurality of projecting portions 14 of the one coupler 10*a* by moving the pair of couplers 10*a* and 10*b* closer to each other in a state that they are concentrically arranged, and the pair of couplers 10*a* and 10*b* can be rotated relative to each other to engage the plurality of engagement pieces 16 of the projecting portions 14 of the one couplers 10*a* with the plurality of engagement pieces 16 of the protrusions 14 of the other coupler 10*b*. On the contrary, rotations of the pair of couplers 10*a* and 10*b* relative to each other to release the coupling of the pair of couplers 10*a* and 10*b* with each other is allowed.

Figure 16:
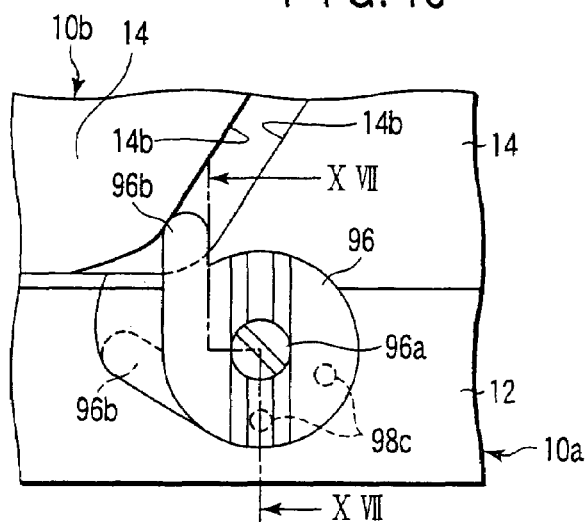
FIG. 16 is an enlarged view of a coupling apparatus including a release preventing structure and according to a seventh embodiment of the present invention, in which a rotary type release preventing member of the release preventing structure performs a release preventing operation at a release preventing position.
Figure 17:
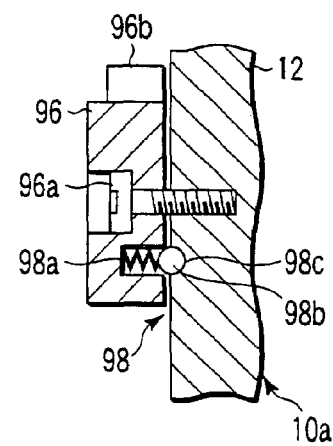
FIG. 17 is a cross-sectional view of the release preventing structure taken along a line XVII-XVII in FIG. 16.

When the rotary type release preventing member 96 is rotated to the release preventing position while the pair of couplers 10*a* and 10*b* are coupled with each other as indicated by a two-dots chain line in FIG. 14, the release preventing projection 96*b* of the rotary type release preventing member 96 projects beyond the bottom surface of the one indent corresponding to the rotary type release preventing member 96 into the one indent as indicated by a solid line in FIG. 16. In more detail, while the pair of couplers 10*a* and 10*b* are coupled with each other as indicated by a two-dots chain line in FIG. 14, a gap is produced between the side surface 14*b* located opposite to the engagement piece 16 in one of the projecting portions 14 of the one coupler 10*a* and the side surface 14*b* located opposite to the engagement piece 16 in one of the projecting portions 14 of the other coupler 10*b*, the one projecting portion 14 of the one coupler 10*a* being neighboring the one projecting portion 14 of the other coupler 10*a*. And, the release preventing projection 96*b* of the rotary type release preventing member 96 located in the release preventing position projected in the one indent inserted in the gap corresponding to the one indent.

When the pair of couplers 10*a* and 10*b* coupled with each other are rotated to release the coupling of the pair of couplers 10*a* and 10*b*, the release preventing projection 96*b* of the rotary type release preventing member 96 at the release preventing position comes into contact with the side surface 14*b* located opposite to the engagement piece 16 in the one projecting portion 14 of the other coupler 10*b* corresponding to the one indent of the one coupler 10*a*, thereby preventing the rotations of the pair of couplers 10*a* and 10*b* to release the coupling of the pair of couplers 10*a* and 10*b*.

In order to separate the pair of couplers 10*a* and 10*b* coupled with each other, the rotary type release preventing member 96 is moved to the release position.

The rotary type release preventing member 96 may be provided on the outer peripheral surface of the coupling main body 12 of the other coupler 10*b*, and any number of rotary type release preventing members 96 may be provided on each of the pair of couplers 10*a* and 10*b* to correspond to any of the bottom surfaces of the plurality of indents of each of the pair of couplers 10*a* and 10*b*.

EIGHTH EMBODIMENT

Next, a coupling apparatus including a release preventing structure and according to an eighth embodiment of the present invention will be described with reference to FIGS. 18 and 19.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, first fixing elements 100 are provided on the outer peripheral surface of the coupling main body 12 of each of the pair of couplers 10*a* and 10*b* coupled with each other. A pair of release preventing members 104 is further provided on the outer peripheral surface of the one coupler 10a. Each of the release preventing members 104 has a second fixing element 102 being able to be fixed with the first fixing elements 100, and is movable between a release preventing position at which the second fixing element 102 is fixed with the first fixing elements 100 and a release position at which the coupling of the second coupling element 102 with the first coupling elements 100 is released.

In this embodiment, each of the pair of release preventing members 104 includes a band-shaped base 106, and one end portion of the base 106 is connected to the outer peripheral surface of the one coupler 10a by a connection member 108 in such a manner that the one end portion of the base 106 can be rotated around the connection member 108 or the one end portion of the base 106 can be bent at the connection member 108. The second fixing element 102 is attached on a first surface of the base 106. The first surface faces the outer peripheral surface of the one coupler 10a when the other end portion of the base 106 of each release preventing member 104 is arranged to laid on the outer peripheral surface of the coupling main body 12 of each of the couplers 10a and 10b as indicated by a two-dots chain line in FIG. 19. A third fixing element 110 is attached on a second surface of the base 106. The second surface faces outward from the outer peripheral surface of the coupling main body 12 of each of the couplers 10a and 10b when the other end portion of each base 106 of the release preventing members 104 is arranged to laid on the outer peripheral surface of the coupling main body 12 of each of the couplers 10a and 10b as described above.

In this embodiment, the first fixing element 100 and the second fixing element 102 may be configured with surface fasteners such as Velcro (registered trade name) which can be detachably fixed with each other. The third fixing elements 110 may be configured with surface fasteners such as Velcro (registered trade name) which can be detachably fixed with each other or press-studs.

Figure 18:
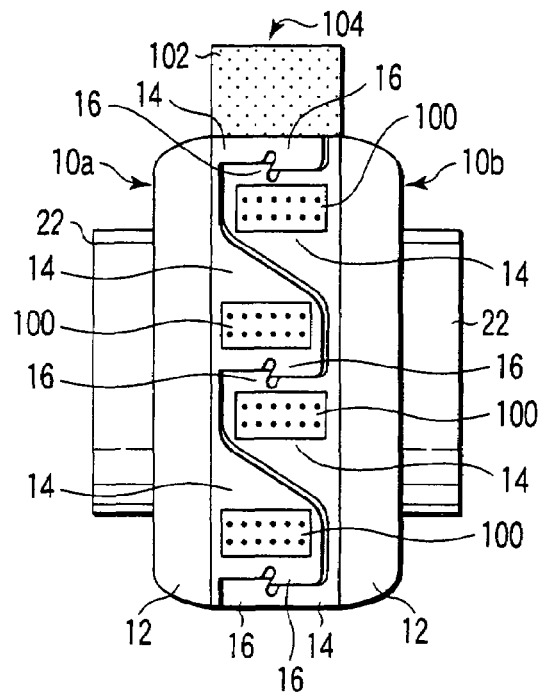
FIG. 18 is a side view of a coupling apparatus including a release preventing structure and according to an eighth embodiment of the present invention, in which one of release preventing bands of the release preventing structure arranged at a release position is shown.
Figure 19:
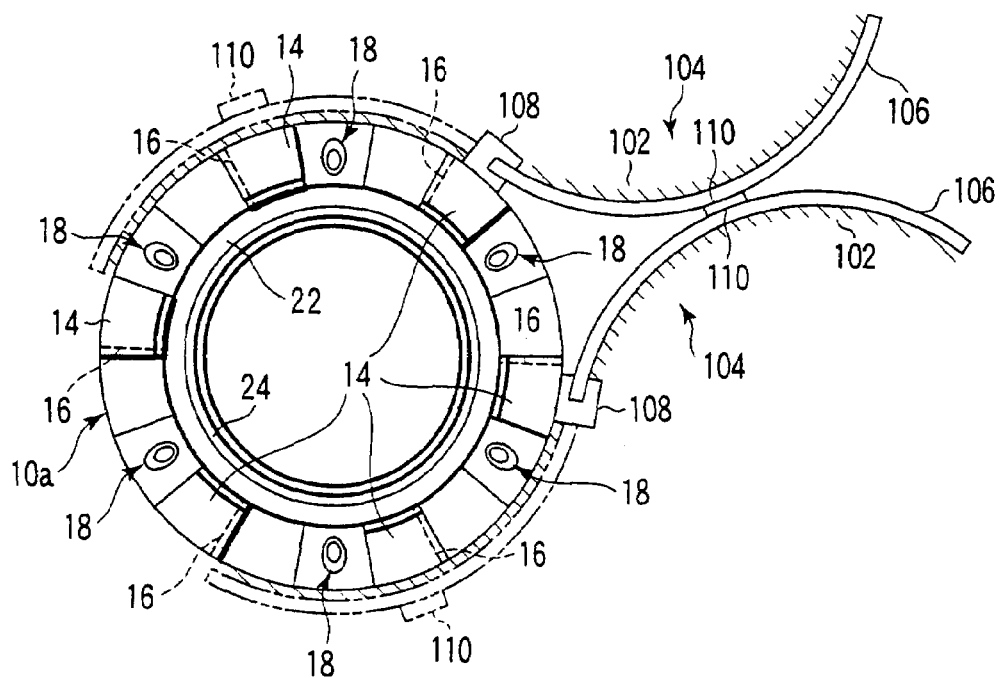
FIG. 19 is a front view of one coupler of the coupling apparatus including the release preventing structure and shown in FIG. 18, in which release positions of the release preventing bands are indicated by a solid line and release preventing positions of the same are indicated by a two-dots chain line.

When, as indicated by a solid line in FIG. 18 and FIG. 19, the other end portions of the respective base materials 106 of the pair of release preventing members 104 are arranged away from the outer peripheral surfaces of the coupling main bodies 12 of the pair of couplers 10a and 10b and the third fixing elements 110 of the bases 106 of the pair of release preventing members 104 are fixed with each other, the pair of release preventing members 104 can be held in the above-described separated positions. In this time, in order to couple the pair of couplers 10a and 10b with each other, the plurality of projecting portions 14 of the other coupler 10b can be inserted into the plurality of indents between the plurality of projecting portions 14 of the one coupler 10a by moving the pair of couplers 10a and 10b closer to each other in a state that they are concentrically arranged, and further the pair of couplers 10a and 10b can be rotated relative to each other so that the plurality of engagement pieces 16 of the projecting portions 14 of the one coupler 10a can be engaged with the plurality of engagement pieces 16 of the projecting portions 14 of the other coupler 10b. On the contrary, the pair of couplers 10a and 10b coupled with each other is allowed to rotate relative to each other to release the coupling of the pair of couplers 10a and 10b with each other. That is, the above-described separated positions are the release positions of the pair of release preventing members 104.

After the pair of couplers 10a and 10b are coupled with each other as shown in FIG. 18 while the pair of release preventing members 104 are arranged at the above-described separated positions, i.e., the release positions, when the other end portions of the bases 106 of the release preventing members 104 are arranged to be laid on the outer peripheral surfaces of the coupling main bodies 12 of the pair of couplers 10a and 10b as indicated by the two-dots chain line in FIG. 19, the second fixing elements 102 of the bases 106 of the pair of release preventing members 104 can be fixed with the first fixing elements 100 on the outer peripheral surfaces.

As a result, the pair of couplers 10a and 10b coupled with each other can not be rotated to release the coupling of the couplers 10a and 10b with each other, and thus the above-described laid-on positions are the release preventing positions of the pair of release preventing members 104.

In order to release the coupling of the pair of couplers 10a and 10b coupled with each other, the pair of release preventing members 104 are moved to the separated positions, i.e., the release positions from the laid-on positions, i.e., the release preventing positions.

If the rotations of the couplers 10a and 10b coupled with each other to release the coupling of the couplers 10a and 10b with each other can be prevented, only one release preventing member 104 may be provided on the at least one of the pair of couplers 10a and 10b. Further, the release preventing members 104 may be provided on the other one of the pair of couplers 10a and 10b like on the at least one of the pair of couplers 10a and 10b, and the plurality of release preventing members 10a and 10b may be provided on each of the pair of couplers 10a and 10b. Furthermore, only one first fixing element 100 may be provided on the outer peripheral surface of the coupling main body 12 of each of the pair of couplers 10a and 10b.

NINTH EMBODIMENT

Next, a coupling apparatus including a release preventing structure and according to a ninth embodiment of the present invention will be described with reference to FIGS. 20 and 21.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a pair of band-shaped release preventing members 112 is provided on the outer peripheral surface of the coupling main body 12 of at least one of the pair of couplers 10a and 10b to be coupled with each other. In this embodiment, each of the release preventing members 112 includes a band-shaped base 114, and one end portion of the base 114 is connected to the outer peripheral surface of the at least one coupler 10a by a connection member 116 so that the one end portion of the base 114 can be rotated around the connection member 116 or the one end portion of the base 114 can be bent at the connection member 116. As a result, the base 114 of each release preventing member 112 can move between a release preventing position where the base 114 is arranged along the outer peripheral surface of the at least one coupling main body 12 and a release position where the base 114 is separated from the outer peripheral surface.

A release preventing protrusion 118 is provided on a first surface of the base 114. The first surface faces the outer peripheral surface of the coupling main body 12 of the at least one coupler 10a when the other end portion of the base material 114 of each of the pair of release preventing members 112 is arranged to laid on the outer peripheral surface of the coupling main body 12 of the at least one coupler 10a as indicated by a two-dots chain line in FIG. 21. A fixing element 119 is attached on a second surface of the base 114. The second surface faces outward from the outer peripheral surface of the coupling main body 12 of the at least one coupler 10a when the other end portion of the base 114 of each of the pair of release preventing members 112 is arranged to laid on the outer peripheral surface of the coupling main body 12 of the at least one coupler 10a as described above.

In this embodiment, the fixing elements 119 may be configured with surface fasteners like Velcro (registered trade name) which can be detachably fixed with each other, or may be press-studs.

Figure 20:
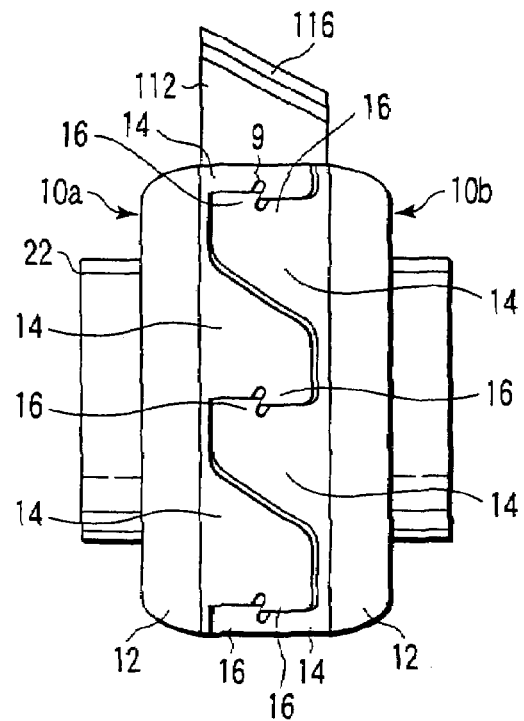
FIG. 20 is a side view of a coupling apparatus including a release preventing structure and according to a ninth embodiment of the present invention, in which one of release preventing bands of the release preventing structure arranged at a release position is shown.
Figure 21:
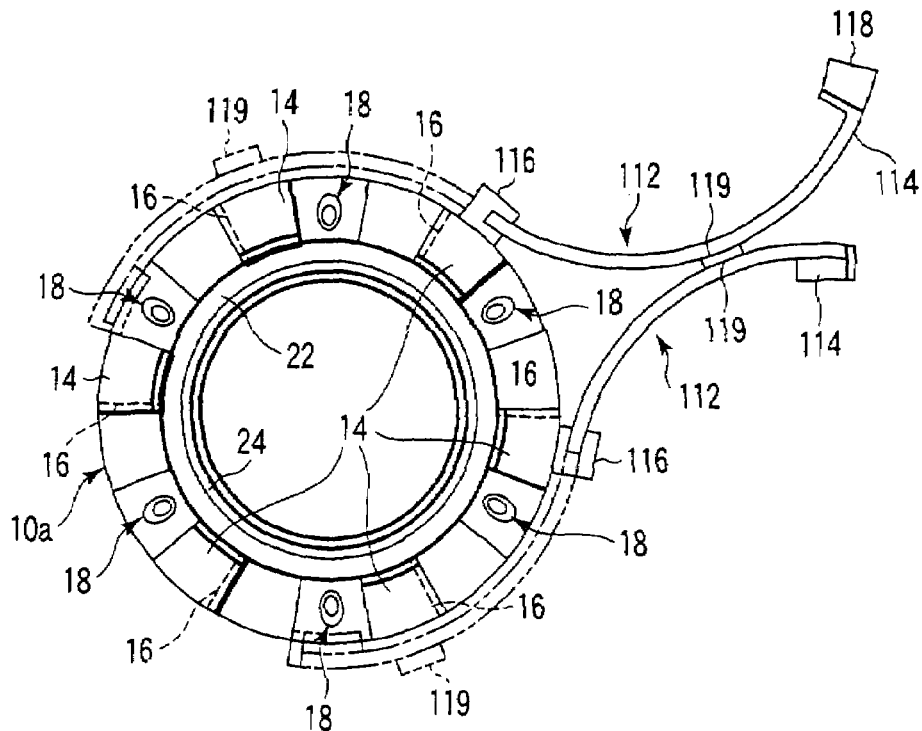
FIG. 21 is a front view of one coupler of the coupling apparatus including the release preventing structure and shown in FIG. 20, in which release positions of the release preventing bands of the release preventing structure are indicated by a solid line and release preventing positions of the same are indicated by a two-dots chain line.

When, as indicated by the solid line in FIGS. 20 and 21, the other end portions of the bases 114 of the pair of release preventing members 112 are arranged to be separated from the outer peripheral surface of the coupling main body 12 of the at least one coupler 10 and the fixing elements 119 of the bases 114 of the pair of release preventing members 112 are fixed to each other, the pair of release preventing members 112 can be held at the above-described separated positions. In this time, in order to couple the pair of couplers 10a and 10b with each other, the plurality of projecting portions 14 of the other coupler 10b can be inserted into the plurality of indents between the plurality of projecting portions 14 of the one coupler 10a by moving the pair of couplers 10a and 10b closer to each other in a state that they are concentrically arranged with each other, and further the pair of couplers 10a and 10b can be rotated relative to each other so that the plurality of engagement pieces 16 of the projecting portions 14 of the one coupler 10a can be engaged with the plurality of engagement pieces 16 of the projecting portions 14 of the other coupler 10b. On the contrary, the pair of couplers 10a and 10b coupled with each other are allowed to rotate relative to each other to release the coupling of the couplers 10a and 10b with each other. That is, the above-described separated positions of the pair of release preventing members 112 are the release positions thereof.

When, as shown in FIG. 20, the pair of couplers 10a and 10b are coupled with each other while the pair of release preventing members 112 are arranged at the above-described separated positions, i.e., the release positions, gaps are produced between the side surfaces 14b being located opposite to the plurality of engagement pieces 16 in the plurality of projecting portions 14 of the one coupler 10a and the side surfaces 14b being located opposite to the plurality of engagement pieces 16 in the plurality of projecting portions 14 of the other coupler 10b. In this state, when the other end portion of the base 114 of each of the pair of release preventing members 112 is arranged to be laid on the outer peripheral surface of the coupling main body 12 of each of the pair of couplers 10a and 10b as indicated by a two-dots chain line in FIG. 21, i.e., when the pair of release preventing members 112 are arranged at the release preventing positions, the release preventing protrusion 118 of the base 14 of each of the pair of release preventing members 112 can be inserted into the gap.

When the pair of couplers 10a and 10b coupled with each other are rotated relative to each other to release the coupling of the pair of couplers 10a and 10b with each other, the release preventing protrusion 118 of the other end portion of each of the pair of release preventing members 112 arranged at the release preventing positions comes into contact with the side surface 14b of one of the projecting portions 14 of the other coupler 10b neighboring to the release preventing protrusion 118, thereby preventing the rotation of the pair of couplers 10a and 10b to release the coupling of the pair of couplers 10a and 10b with each other.

In order to release the coupling of the pair of couplers 10a and 10b with each other, the pair of release preventing members 112 are moved to the release positions.

Only one release preventing member 112 may be provided on at least one of the pair of couplers 10a and 10b. Moreover, the release preventing members 112 may be provided on the other coupler 10b like on the at least one coupler 10a. Furthermore, a plurality of release preventing members 112 may be provided on each of the pair of couplers 10a and 10b.

Tenth Embodiment

Figure 22:
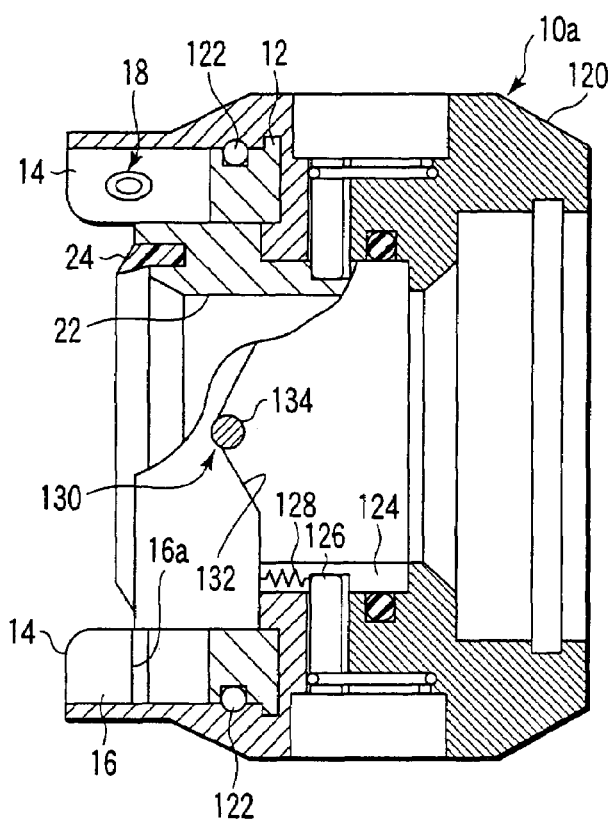
FIG. 22 is a vertical cross-sectional view of one coupler of a coupling apparatus including a release preventing structure and according to a tenth embodiment of the present invention.
Figure 23:
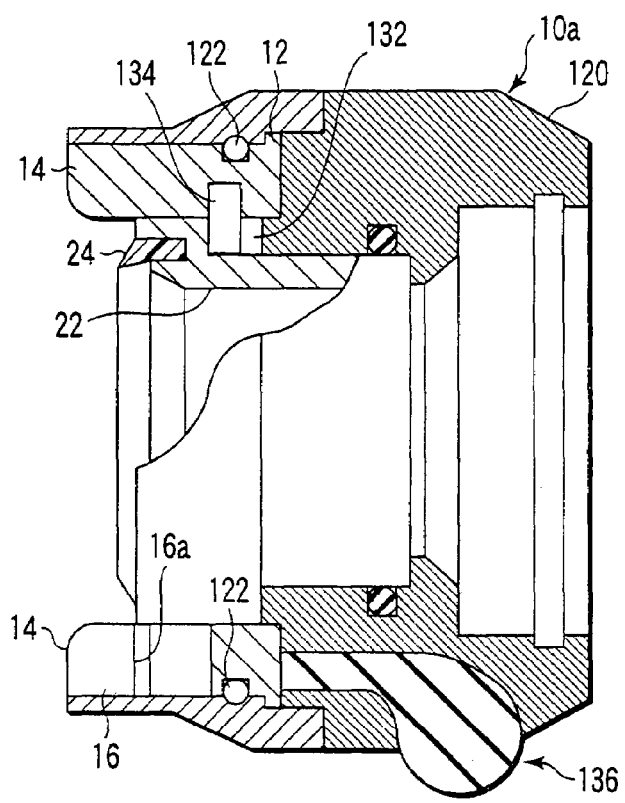
FIG. 23 is another vertical cross-sectional view of the one coupler of the coupling apparatus including the release preventing structure and according to the tenth embodiment of the present invention, in which a vertical cross section of FIG. 23 is placed at a position rotated from a vertical cross section of FIG. 22 by 90°.

Next, a coupling apparatus including a release preventing structure and according to a tenth embodiment of the present invention will be described with reference to FIGS. 22 and 23.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, each of the pair of couplers 10a and 10b to be coupled with each other comprises a holder member 120 holding the coupling main body 12 and the liner 22. The holder member 120 holds the outer peripheral surface of the coupling main body 12 so as to make the coupling main body 12 being able to rotate. This is realized by holding the outer peripheral surface of the coupling main body 12 with a plurality of balls 122 held between an annular groove on an inner peripheral surface of the holder member 120 and an annular groove on the outer peripheral surface of the coupling main body 12. A large-diameter portion of the liner 22 is held on the inner peripheral surface of the coupling main body 12 so that the large-diameter portion of the liner 22 can rotate relative to the coupling main body 12 and move in the longitudinal direction of the coupling main body 12. The inner peripheral surface of the holder member 120 further holds a small-diameter portion of the liner 22 so that the small-diameter portion can move in a longitudinal direction of the holder member 120. This is realized by inserting a guide pin 126 protruding from the inner peripheral surface of the holder member 120 into a guide groove 124 formed in the outer peripheral surface of the small-diameter portion of the liner 22 to extend in the longitudinal direction.

An urging mechanism 128 is interposed between the liner 22 and the holder member 120 and urges the liner 22 in a direction opposite to the projecting direction of each of the projecting portions 14 of the coupling main body 12.

In this embodiment, the urging mechanism 128 is configured with an extension coil spring both ends of which are fixed to the guide pin 126 and a step between the large-diameter portion and the small-diameter portion on the outer peripheral surface of the liner 22.

A rotational movement/linear movement converting mechanism 130 is interposed between the coupling main body 12 and the liner 22. The rotational movement/linear movement converting mechanism 130 moves the liner 22 in the longitudinal direction by the rotation of the coupling main body 12 in one circumferential direction or the other circumferential direction thereof. In this embodiment, the rotational movement/linear movement converting mechanism 130 comprises a cam groove 132 formed in the step between the large-diameter portion and the small-diameter portion on the outer peripheral surface, of the liner 22, and a cam pin 134 protruding into the cam groove 132 from the inner peripheral surface of the coupling main body 12. The cam groove 132 has a substantially triangular shape whose width in the circumferential direction is narrowed from the step toward the protruding ends of the projecting portions 14 of the coupling main body 12. Therefore, in a usual state, an apex of the cam groove 132 is in contact with the cam pin 134 as well shown in FIG. 22.

A selective rotation stop mechanism 136 is further interposed between the holder member 120 and the coupling main body 12, and the selective rotation stop mechanism 136 selectively stops the rotation of the coupling main body 12. In this embodiment, the selective rotation stop mechanism 136 is configured with a pushed-expand member such as rubber which extends in the holder member 120 from the outer peripheral surface of the holder member 120 to an area of the inner peripheral surface of the holder member 120 facing the outer surface of the coupling main body 12.

In the coupling apparatus including the release preventing structure, according to the tenth embodiment, and having the above-described configuration, the plurality of projecting portions 14 of one coupler 10a can be inserted into the plurality of indents between the plurality of projecting portions 14 of the other coupler 10b by moving the pair of couplers 10a and 10b closer to each other in a state that they are concentrically arranged to each other, and further the pair of couplers 10a and 10b can be rotated relative to each other so that the plurality of engagement pieces 16 of the projecting portions 14 of the one coupler 10a can be engaged with the plurality of engagement pieces 16 of the projecting portions 14 of the other coupler 10b.

However, on the contrary, when the pair of couplers 10a and 10b coupled with each other are rotated relative to each other to separate the pair of couplers 10a and 10b from each other, the both coupling main bodies 12 of the pair of couplers 10a and 10b freely rotate with respect to the holder members 120 and liners 22 corresponding to the both coupling main bodies 12 in the holder members 120 so that the coupling of the pair of couplers 10a and 10b with each other cannot be released. Additionally, these relative rotations cause the cam pin 134 of the coupling main body 12 to push a side surface of the cam groove 132 of the liner 22. As a result, the liner 22 is moved linearly in the protruding direction of each of the projecting portions 14 of the coupling main body 12 against the urging force of the urging mechanism 128, and the seal members 24 on the protruding ends of the liners 22 of the pair of couplers 10a and 10b are strongly pushed against each other. This makes the pressures, with which the engagement surfaces 16a of the engagement pieces 16 of the projecting portions 14 of the coupling main body 12 of the one coupler 10a are engaged with the engagement surfaces 16a of the engagement pieces 16 of the projecting portions 14 of the coupling main body 12 of the one coupler 10a, being increased in the longitudinal direction along which the pair of couplers 10a and 10b are separated from each other, and hence the release of the coupling of the couplers 10a and 10b becomes more difficult.

In order to release the coupling of the couplers 10a and 10b with each other, a portion of the pushed-expand member of the selective rotation stop mechanism 136 exposed on the outer peripheral surface of the holder portion 120 of each of the pair of couplers 10a and 10b is pushed. By pushing the exposed area of the pushed-expand member as describe above, the pushed-expand member expands toward the outer surface of the coupling member main body 12 from an area of the inner peripheral surface of the holder member 120 facing the outer surface of the coupling main body 12, and provide a large frictional force between itself and the outer surface of the coupling main body 12 to prevent the rotation of the coupling main body 12 with respect to the holder member 12.

In this state, the pair of couplers 10a and 10b coupled with each other can be rotated relative to each other to separate the pair of couplers 10a and 10b from each other.

The urging mechanism 128, the rotational movement/linear movement converting mechanism 130, and the selective rotation stop mechanism 136 can be provided at any circumferential positions in each of the pair of couplers 10a and 10b.

Eleventh Embodiment

Figure 24:
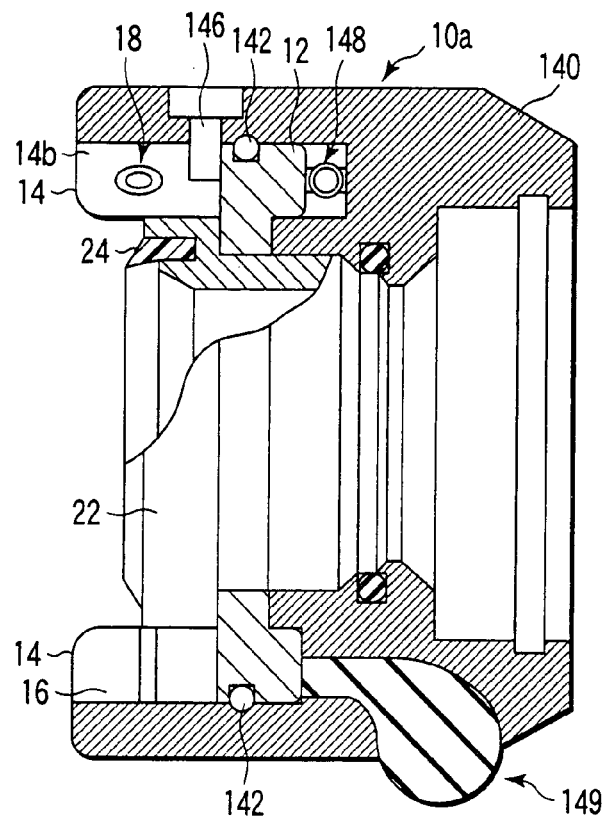
FIG. 24 is a vertical cross-sectional view of one coupler of a coupling apparatus including a release preventing structure and according to an eleventh embodiment of the present invention.
Figure 25:
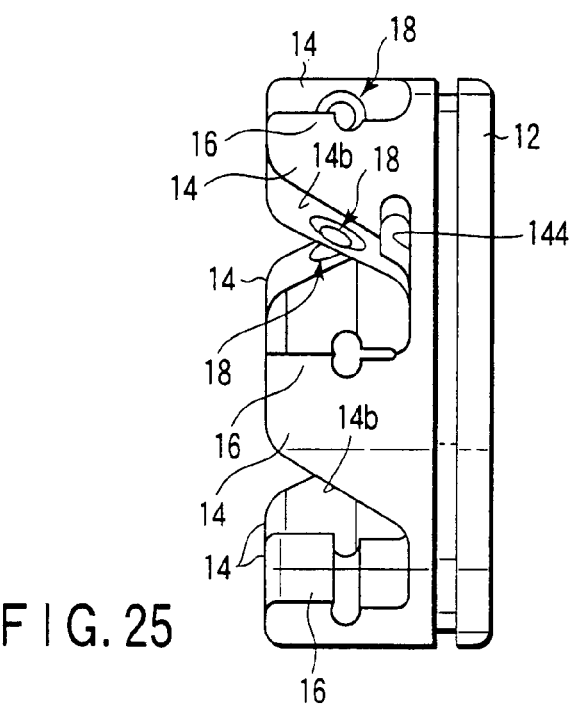
FIG. 25 is a side view of a coupling main body of the one coupler shown in FIG. 24.

Next, a coupling apparatus including a release preventing structure and according to a eleventh embodiment of the present invention will be described with reference to FIGS. 24 and 25.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, each of the pair of couplers 10a and 10b to be coupled with each other includes a holder member 140 which holds the coupling main body 12 and the liner 22.

The holder member 140 holds an outer peripheral surface of the coupling main body 12 so that the coupling main body 12 is able to be rotated relative to the holder member 140. This is realized by holding the outer peripheral surface of the coupling main body 12 with a plurality of balls 142 held in an annular groove formed on an inner peripheral surface of the holder member 140 and an annular groove formed on the outer peripheral surface of the coupling main body 12. The inner peripheral surface of the coupling main body 12 can rotate with respect to the outer peripheral surface of the liner 22, and the liner 22 is fixed on the inner peripheral surface of the holder member 140.

That is, the coupling main body 12 can rotate in the holder member 140 with respect to both of the holder member 140 and the liner 22 fixed to the holder member 140.

A release preventing member accommodating groove 144 is formed at a base part of at least one of the projecting portions 14 of the coupling main body 12, and one end of the release preventing member accommodating groove 144 is opened on the side surface 14b of the at least one projecting portion 14 facing opposite to engagement piece 16.

The holder member 140 comprises a release preventing member 146. The release preventing member 146 can move with respect to the coupling main body 12 in the circumferential direction of the coupling main body 12 between a release position where the release preventing member 146 is retracted into the release preventing member accommodating groove 144 and a release preventing position where the release preventing member 146 protrudes from the release preventing member accommodating groove 144 into the indent in which the release preventing member accommodating groove 144 is opened, when the coupling main body 12 rotates with respect to the holder member 140 in one circumferential direction or in the other circumferential direction.

An urging mechanism 148 is interposed between the inner surface of the holder member 140 and the outer surface of the coupling main body 12. The urging mechanism 148 urges the coupling main body 12 so that the coupling main body 12 always rotates in the one circumferential direction. In this embodiment, the urging mechanism 148 is configured with an extension coil spring having both ends one of which is fixed on the inner surface of the holder member 140 and the other of which is separated from the one end in the circumferential direction and fixed on the outer surface of the coupling main body 12. The release preventing member 146 of the holder member 140 is usually accommodated in the release preventing member accommodation groove 144 of the coupling main body 12 urged by the urging mechanism 148.

A selective rotation stop mechanism 149 which selectively stops the rotation of the coupling main body 12 is further interposed between the holder member 140 and the coupling main body 12. In this embodiment, the selective rotation stop mechanism 149 is configured with a pushed-expand member such as rubber which extends in the holder member 140 from the outer peripheral surface of the holder member 140 to an area of the inner peripheral surface of the holder member 140 facing the outer surface of the coupling main body 12.

While the release preventing member 146 of the holder member 140 is arranged at the release position, in order to couple the pair of couplers 10a and 10b with each other, the plurality of projecting portions 14 of the one coupler 10a can be inserted into the plurality of indents between the plurality of projecting portions 14 of the other coupler 10b by moving the pair of couplers 10a and 10b closer to each other in a state that they are concentrically arranged with each other, and further the pair of couplers 10a and 10b can be rotated relative to each other so that the plurality of engagement pieces 16 of the projecting portions 14 of the one coupler 10a can be engaged with the plurality of engagement pieces 16 of the projecting portions 14 of the other coupler 10b.

However, when the pair of couplers 10a and 10b coupled with each other are rotated relative to each other to release the coupling of the pair of couplers 10a and 10b with each other, the coupling main body 12 rotates with respect to the holder member 140 against the urging force of the urging mechanism 148. As a result, the release preventing member 146 of the holder member 140 is moved in the circumferential direction with respect to the coupling main body 12 rotated as described above from the release position where the release preventing member 146 is retracted into the preventing member accommodating groove 144 to the release preventing position protruding into the indent in which the preventing member accommodating groove 144 is opened. The release preventing member 146 at the release preventing position is interposed in a gap between the bottom surface of the indent and a protruding end of one projecting portion 14 of the other coupler 10b inserted into the one indent.

As a result, the movement of the pair of couplers 10a and 10b in the longitudinal direction to move the couplers 10a and 10b closer to each other becomes impossible, which is required to release the engagements between the engagement pieces 16 of the projecting portions 14 of the coupling main body 12 of the one coupler 10a and the engagement pieces 16 of the projecting portions 14 of the coupling main body 12 of the other coupler 10b in the longitudinal direction. Therefore, the rotations of the pair of couplers 10a and 10b to release the coupling of the couplers 10a and 10b with each other becomes impossible.

In order to release the coupling of the pair of couplers 10a and 10b with each other, before rotating the pair of couplers 10a and 10b relative to each other to release the coupling of the couplers 10a and 10b, a portion of the pushed-expand member of the selective rotation stop mechanism 149 exposed on the outer peripheral surface of the holder member 140 is pushed. When the exposed portion of the pushed-expand member is pushed, the pushed-expand member expands from an area of the inner peripheral surface of the holder member 140 facing the outer surface of the coupling main body 12 toward the outer surface of the coupling main body 12, and provides a large frictional force between itself and the outer surface of the coupling main body 12 to inhibit a free rotation of the coupling main body 12 with respect to the holder member 140.

In this state, when the couplers 10a and 10b are rotated relative to each other to separate the couplers 10a and 10b from each other, the coupling main bodies 12 can rotate together with the holder members 140 corresponding thereto. As a result, the coupling main body 12 does not rotate with respect to the holder member 140 against the urging force of the urging mechanism 148, and the release preventing member 146 of the holder member 140 does not move from the release position where the release preventing member 146 is retracted into the preventing member accommodating groove 144 to the above-described release preventing position. Therefore, the pair of couplers 10a and 10b can be rotated relative to each other to release the coupling of the couplers 10a and 10b, thereby releasing the coupling.

The release preventing member 146 of the holder member 140 and the preventing member accommodating groove 144 of the coupling main body 12 may be provided in the other coupler 10b like in the one coupler 10a as mentioned above, and any number of the members 146 and those of the accommodating grooves 144 may be provided at any positions corresponding to the plurality of projecting portions 14 of the coupling main body 12 and the plurality of indents between these projecting portions 14 in each of the pair of couplers 10a and 10b.

Twelfth Embodiment

Next, a coupling apparatus including a release preventing structure and according to a twelfth embodiment of the present invention will be described with reference to FIGS. 26 to 29.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a release preventing elastic band 150 of the release preventing structure is provided on the outer peripheral surface of the coupling main body 21 of at least one of the pair of couplers 10a and 10b to be coupled with each other. The release preventing elastic band 150 is configured with a band-shaped leaf spring. One end portion of the release preventing elastic band 150 is fixed on the outer peripheral surface of the coupling main body 12 of the at least one coupler 10a by a fixing member 152 such as a fixing pin. The release preventing elastic band 150 extends over the plurality of projecting portions 14 along the outer peripheral surface of the coupling main body 12 from the one end portion mentioned above in the circumferential direction of the coupling main body 12. A release preventing member 150a is formed at the other end portion of the release preventing elastic band 150, and the release preventing member 150a protrudes into one of the plurality of indents between the plurality of projecting portions 14 of the coupling main body 12. The release preventing member 150a is arranged near to the surface 14b in which the urging unit 18 is set in one projecting portion 14 neighboring the one indent mentioned above. An operating portion 150b is further provided at the other end portion of the release preventing elastic band 150, and the operating portion 150b is raised from the other end portion to be away from the indent.

The release preventing elastic band 150 further has a driving projection 150c between the one end portion and the other end portion, and the driving projection 150c protrudes into the one indent mentioned above. The driving projection 150c is arranged near to the engagement surface 16a at the protruding end of the engagement piece 16 of another projecting portion 14 neighboring the one indent mentioned above. The driving projection 150c has a driving surface 150d facing in the protruding direction of the above mentioned another projecting portion 14, and the driving surface 150d is configured with an inclined surface which is inclined from the release preventing elastic band 150 toward the bottom surface of the one indent mentioned above, as shown in FIG. 28.

Figure 26:
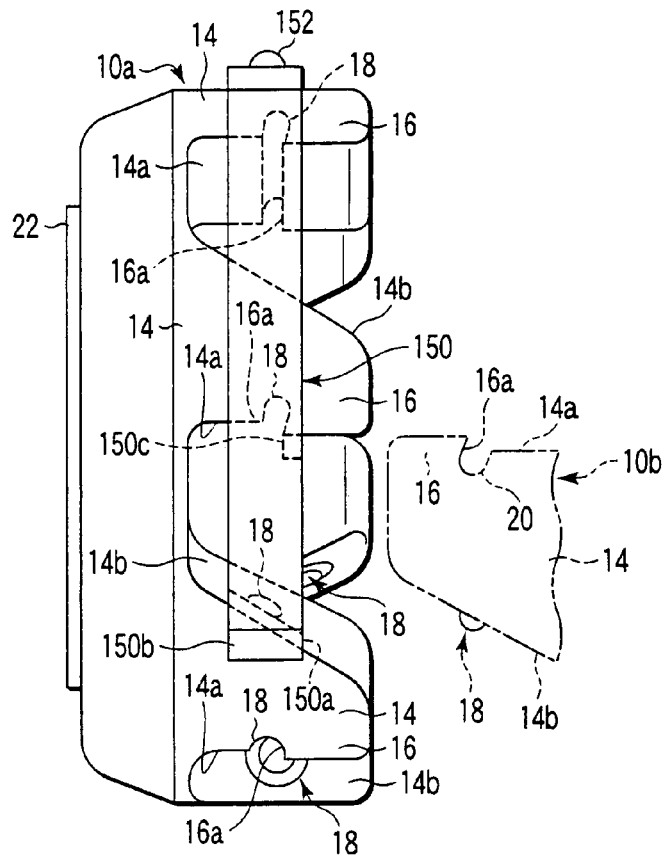
FIG. 26 is a side view of one coupler of a coupling apparatus including a release preventing structure and according to a twelfth embodiment of the present invention.
Figure 27:
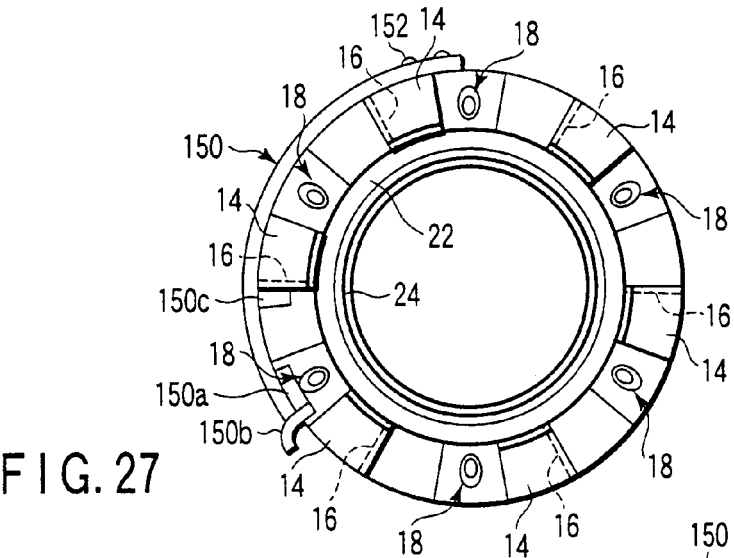
FIG. 27 is a front view of the one coupler shown in FIG. 26.
Figure 28:
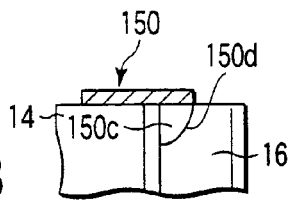
FIGS. 28 and 29 are cross-sectional views taken along a line XXVIII-XXVIII in FIG. 26 and showing a change when a release preventing elastic band of the release preventing structure of the one coupler shown in FIG. 26 is moved from a state before release preventing to a release preventing state.

The release preventing elastic band 150 is arranged by its own elastic force at a release preventing position where the release preventing elastic band 150 extends along the outer peripheral surface of the coupling main body 12, as shown in FIGS. 26 and 27.

Figure 29:
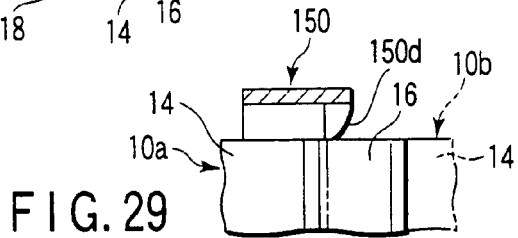

When, in order to couple the pair of couplers 10a and 10b with each other, the plurality of projecting portions 14 of the other coupler 10b are inserted into the plurality of indents between the plurality of projecting portions 14 of the one coupler 10a by moving the pair of couplers 10a and 10b closer to each other in a state that they are concentrically arranged to each other, a protruding end of one projecting portion 14 of the other coupler 10b corresponding to the one indent of the one coupler 10a collides with the driving surface 150d of the driving projection 150c of the release preventing elastic band 150 arranged at the release preventing position, as shown in FIG. 29. Then, the corresponding projecting portion 14 of the other coupler 10b lifts up the release preventing elastic band 150 from the outer peripheral surface against its own elastic force to separate the release preventing elastic band 150 from the outer peripheral surface, and moves it to a release position shown in FIG. 29. At the release position, the release preventing member 150a at the other end portion of the release preventing elastic band 150 is lifted up from the one indent mentioned above, and is removed from this one indent.

As a result, the plurality of engagement pieces 16 of the projecting portions 14 of the one coupler 10a can be engaged with the plurality of engagement pieces 16 of the projecting portions 14 of the other coupler 10b. After the pair of couplers 10a and 10b are coupled with each other in this manner, the driving projection 150c of the release preventing elastic band 150 is inserted into a stress relaxation groove 18 on the side surface 14a on which the engagement piece 16 is provided in the one projecting portion 14 of the other coupler 10b inserted into the above described one indent of the one coupler 10a. while the pair of couplers 10a and 10b are coupled with each other, gaps are produced between the side surfaces 14b facing opposite to the plurality of engagement pieces 16 in the plurality of projecting portions 14 of the one coupler 10a and the side surfaces 14b facing opposite to the plurality of engagement pieces 16 in the plurality of projecting portions 14 of the other coupler 10b. And, the release preventing member 150a at the other end portion of the release preventing elastic band 150 falls in one gap produced in the one indent, so that the release preventing elastic band 150 returns to the release preventing position along the outer peripheral surface of the coupling main body 12 by its own elastic force as shown in FIGS. 26 and 27.

When the pair of couplers 10a and 10b are rotated relative to each other in order to release the coupling of the couplers 10a and 10b while the release preventing elastic band 150 is arranged at the release preventing position, the release preventing member 150a at the other end portion of the release preventing elastic band 150 comes into contact with the side surface 14b of the corresponding projecting portion 14 of the other coupler 10b, thereby preventing the rotations of the pair of couplers 10a and 10b to release the coupling of the couplers 10a and 10b.

In order to separate the pair of couplers 10a and 10b coupled with each other from each other, the release preventing elastic band 150 is lifted up by picking up the operation portion 150b at the other end portion of the release preventing elastic band 150 with user's fingers to separate the release preventing elastic band 150 from the outer peripheral surface of the coupling main body 12 to the release position.

The release preventing elastic band 150 may be provided on the outer peripheral surface of the coupling main body 12 of the other coupler 10b in such a manner as described above, and the release preventing elastic bands 150 may be provided at a plurality of desired positions on the outer peripheral surface of the coupling main body 12 of each of the pair of couplers 10a and 10b.

Thirteenth Embodiment

Next, a coupling apparatus including a release preventing structure and according to a thirteenth embodiment of the present invention will be described with reference to FIGS. 30 to 32.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a release preventing member 160 of a release preventing structure is provided in the coupling main body 12 of at least one of a pair of couplers 10a and 10b to be coupled with each other. The release preventing member 160 is provided at a position adjacent to one of the bottom surfaces of the plurality of indents between the plurality of projecting portions 14 of the coupling main body 12 of the at least one coupler 10a, and is movable in the longitudinal direction of the at least one coupler 10a. Movement of the release preventing member 160 in the longitudinal direction is restricted within a predetermined range by a movement range restricting mechanism 162. In this embodiment, the movement range restricting mechanism 162 comprises a guide slot 162a formed at the adjacent position in the outer peripheral surface and extending in the longitudinal direction and a guide member 162b for the release preventing member 160, inserted into the guide slot 162a. An operation member 164 of an operation mechanism is fixed to the guide member 162b on the outer peripheral surface.

When the guide member 162b is arranged at each of both ends of the guide slot 162b in its extending direction, the release preventing member 160 is arranged at each of a release preventing position and a release position, respectively.

The release preventing member 160 arranged at the release preventing position protrudes into the one indent mentioned above from the bottom surface of the one indent, and the release preventing member 160 arranged at the release position does not substantially protrude into the one indent mentioned above from the bottom surface of the one indent.

The release preventing member 160 is urged toward the release preventing position by an urging mechanism 166. In this embodiment, the urging mechanism 166 is configured with a compression coil spring provided at the adjacent position in the coupling main body 12 of the one coupler 10a.

A release preventing recess 168 is formed at the protruding end of each of the plurality of projecting portions 14 of the coupling main body 12 of the other coupler 10b in an area adjacent to the side surface 14b facing opposite to the engagement piece 16 in each projecting portion 14 of the coupling main body 12 of the other coupler 10b.

When, in order to couple the pair of couplers 10a and 10b with each other, the plurality of projecting portions 14 of the other coupler 10b are inserted into the plurality of indents between the plurality of projecting portions 14 of the one coupler 10a by moving the pair of couplers 10a and 10b closer to each other in a state that they are concentrically arranged to each other while the release preventing member 160 is arranged at the release preventing position by the urging force of the urging mechanism 166, an area adjacent to the side surface 14a on which the engagement piece 16 is provided at the protruding end of the projecting portion 14 corresponding to the one indent of the one coupler 10a in the other coupler 10b comes into contact with the protruding end of the release preventing member 160, as indicated by a two-dots chain line in FIG. 30. Thereafter, the above described area of the protruding end of the corresponding projecting portion 14 of the other coupler 10b moves the release preventing member 160 to the release position against the urging force of the urging mechanism 166. Further, the pair of couplers 10a and 10b are rotated relative to each other so that the engagement pieces 16 of the projecting portions 14 of the other coupler 10a are engaged with the engagement pieces 16 of the projecting portions 14 of one coupler 10a, as indicated by a solid line in FIG. 30.

When the pair of couplers 10a and 10b are coupled with each other as described above, the release preventing recess 168 on the protruding end of the corresponding projecting portion 14 of the other coupler 10b faces the protruding end of the release preventing member 160 at the release position, and the release preventing member 160 protrudes into the release preventing recess 168 by the urging force of the urging mechanism 166, as indicated by the solid line in FIG. 30. A position of the release preventing member 160 at this time is the release preventing position.

In this state, when the pair of couplers 10a and 10b coupled with each other are rotated relative to each other to release the coupling of the pair of couplers 10a and 10b with each other, the protrusion end portion of the release preventing member 160 at the release preventing position comes into contact with a circumferential end surface of the release preventing recess 168 in the protruding end of the corresponding projecting portion 14 of the other coupler 10b as indicated by a dotted line in FIG. 30, thereby preventing the rotations of the pair of couplers 10a and 10b relative to each other to release the coupling.

In order to separate the pair of couplers 10a and 10b coupled with each other from each other, the release preventing member 160 is moved from the release preventing position where the release preventing member 160 is projected into the release preventing recess 168 to the release position against the urging force of the urging mechanism 166 by using the operation mechanism 164. As a result, the rotations of the pair of couplers 10a and 10b relative to each other to separate the pair of coupled couplers 10a and 10b from each other is allowed.

The release preventing member 160 may be provided in the coupling main body 12 of the other coupler 10b, and a plurality of release preventing recesses 168 may be formed on protruding ends of the plurality of projecting portions 14 of the coupling main body 12 of the one coupler 10b. Furthermore, a plurality of release preventing members 160 may be provided at any desired positions corresponding to any of the plurality of indents between the plurality of projecting portions 14 of the coupling main body 12 in each of the pair of couplers 10a and 10b.

Fourteenth Embodiment

Next, a coupling apparatus including a release preventing structure and according to a fourteenth embodiment of the present invention will be described with reference to FIG. 33.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, a release preventing member 170 of a release preventing structure is provided in the coupling main body 12 of at least one of a pair of couplers 10a and 10b to be coupled with each other. The release preventing member 170 is provided at a position adjacent to a bottom surface of one of the plurality of indents between the plurality of projecting portions 14 in the coupling main body 12 of the at least one coupler 10a in such a manner that the release preventing member 170 can move in the longitudinal direction of the one coupler 10a. A movement of the release preventing member 170 in the longitudinal direction is restricted within a predetermined range by a movement range restricting mechanism 172. In this embodiment, the movement range restricting mechanism 172 comprises a guide slot 172a formed at the adjacent position in the outer peripheral surface of the coupling main body 12 of the at least one coupler 10a and extending in the longitudinal direction, and a guide member 172b of the release preventing member 170 inserted into the guide slot 172a. An operation member 174 of an operation mechanism is fixed to the guide member 172b on the outer peripheral surface.

When the guide member 174 is arranged at each of both end portions of the guide slot 172 in the longitudinal direction, the release preventing member 170 is arranged at each of a release preventing position and a release position.

The release preventing member 170 arranged at the release preventing position protrudes in the one indent mentioned above from the bottom surface of this one indent, and the release preventing member 170 arranged at the release position does not substantially protrude into the one indent mentioned above from the bottom surface of the one indent mentioned above.

The release preventing member 170 is urged toward the release preventing position by an urging mechanism 176. In this embodiment, the urging mechanism 176 is configured with a compression coil spring provided at the adjacent position in the coupling main body 12 of the one coupler 10a.

When, in order to couple the pair of couplers 10a and 10b with each other, the plurality of projecting portions 14 of the other coupler 10b are inserted into the plurality of indents between the plurality of projecting portions 14 of the one coupler 10a by moving the pair of couplers 10a and 10b closer to each other in a state that they are concentrically arranged to each other while the release preventing member 170 is arranged at the release preventing position by the urging force of the urging mechanism 176, a protruding end of one projecting portion 14 of the other coupler 10b corresponding to the one indent of the one coupler 10a comes into contact with a protruding end of the release preventing member 170, as indicated by a two-dots chain line in FIG. 33. Thereafter, the corresponding one projecting portion 14 of the other coupler 10b moves the release preventing member 170 to the release position against the urging force of the urging mechanism 176. Further, the pair of couplers 10a and 10b are rotated relative to each other by the urging forces of the urging mechanisms 18 of the plurality of projecting portions 14 of each of the pair of couplers 10a and 10b so that the engagement pieces 16 of the projecting portions 14 of the other coupler 10a are engaged with the engagement pieces 16 of the projecting portions 14 of the one coupler 10a as indicated by a solid line in FIG. 33.

While the pair of couplers 10a and 10b are coupled with each other, gaps are produced between the side surfaces 14b facing opposite to the side surfaces 14a on which the engagement pieces 16 are provided in the projecting portions 14 of the coupling main body 12 of the at least one coupler 10a and the side surfaces 14b facing opposite to the side surfaces 14a on which the engagement pieces 16 are provided in the projecting portions 14 of the coupling main body 12 of the other coupler 10b. And, the release preventing member 170 is inserted into one of the gaps corresponding to the one indent by the urging force of the urging mechanism 176, as indicated by the solid line in FIG. 33. A position of the release preventing member 170 at this time is the release preventing position. And, the rotations of the pair of coupling main bodies 10a and 10b relative to each other to release the coupling of the coupling main bodies 10a and 10b with each other are restricted. In this time, the coupling main bodies 10a and 10b can not be rotated relative to each other to release the coupling of the coupling main bodies 10a and 10b.

In order to separate the couplers 10a and 10 coupled with each other from each other, the release preventing member 170 is moved from the release preventing position shown in FIG. 33 to the release position against the urging force of the urging mechanism 176 by the operation mechanism 174. As a result, the rotations of the couplers 10a and 10b coupled with each other to separate the coupled couplers 10a and 10b from each other is allowed.

The release preventing member 170 may be provided in the coupling main body 12 of the other coupler 10b like in the one coupler 10a as described above. Moreover, a plurality of release preventing members 170 may be provided at any desired positions corresponding to any of the plurality of indents between the plurality of projecting portions 14 in the coupling main body 12 in each of the pair of couplers 10a and 10b.

Fifteenth Embodiment

Figure 34:
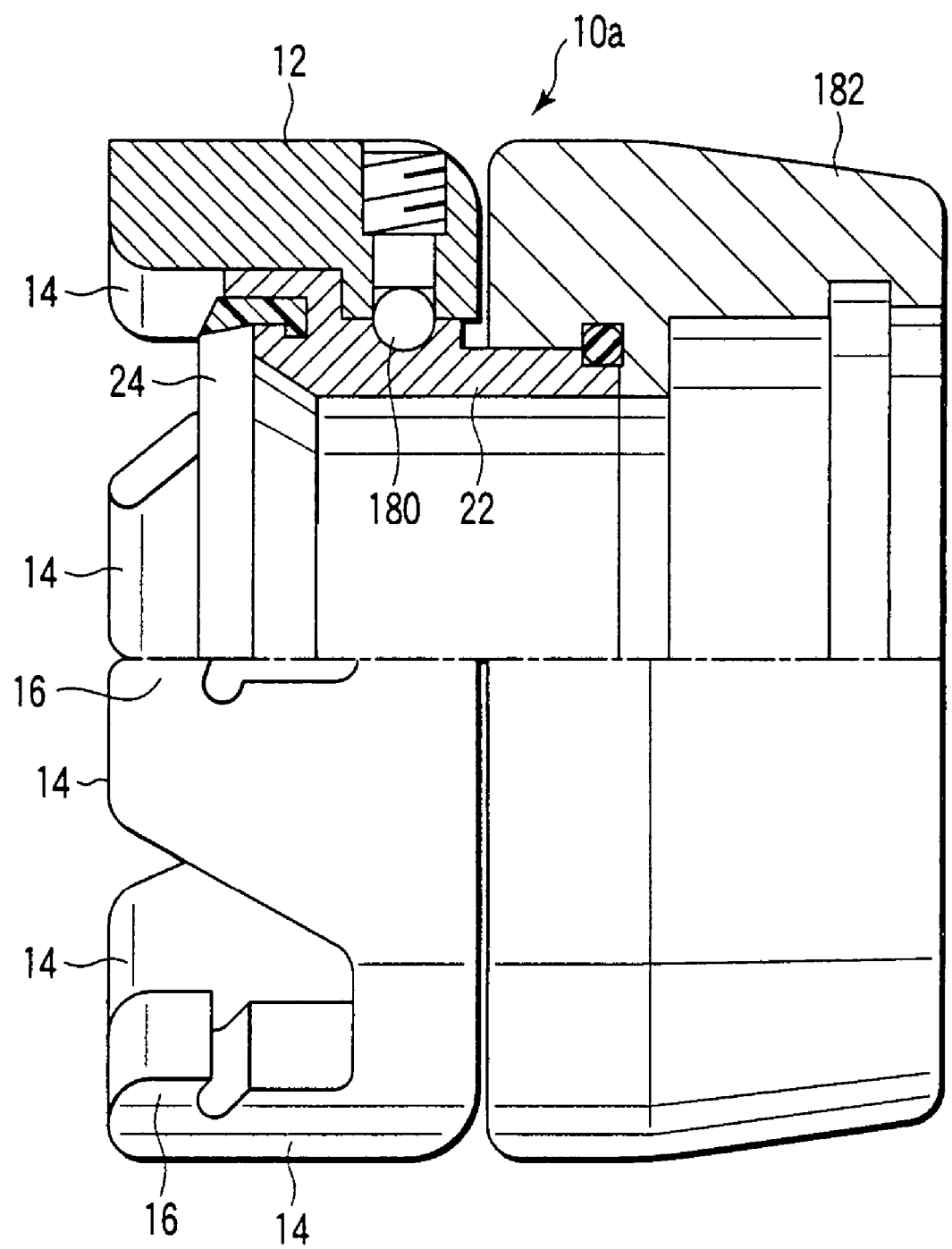
FIG. 34 is a half cross-sectional view of one coupler of a coupling apparatus including a release preventing structure and according to a fifteenth embodiment of the present invention.

Next, a coupling apparatus including a release preventing structure and according to a fifteenth embodiment of the present invention will be described with reference to FIG. 34.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, each of the pair of couplers 10a and 10b to be coupled with each other comprises the coupling main body 12 and the liner 22. The coupling main body 12 is held on an outer peripheral surface of the liner 22 so that the coupling main body 12 can rotate freely thereon. This is realized by holding an inner peripheral surface of the coupling main body 12 by a plurality of balls 180 held in an annular groove on the inner peripheral surface of the coupling main body 12 and an annular groove on the outer peripheral surface of the liner 14. A fixing element 182 which is used to fix a non-illustrated another member to the liner 14 is connected at a position distanced from the coupling main body 12 on the outer peripheral surface of the liner 22.

The pair of couplers 10a and 10b of the coupling apparatus according to the fifteenth embodiment can be readily coupled with each other like the pair of couplers 10a and 10b of the conventional coupling apparatus mentioned above with reference to FIGS. 41 to 43. That is, the plurality of projecting portions 14 of the other coupler 10b are inserted into the plurality of indents between the plurality of projecting portions 14 of the one coupler 10a by moving the pair of couplers 10a and 10b closer to each other in a state that they are concentrically arranged to each other. Additionally, the pair of couplers 10a and 10b are rotated relative to each other so that engagement pieces 16 of the projecting portions 14 of the one coupler 10a are engaged with the engagement pieces 16 of the projecting portions 14 of the other coupler 10b by the urging forces of the urging mechanisms 18 in the projecting portions 14 of each of the pair of couplers 10a and 10b.

Rotational forces loaded to the liners 22 through the fixing elements 182 while the pair of couplers 10a and 10b are coupled with each other are not transmitted to the coupling main bodies 12, and a rotational force loaded to the coupling main bodies 12 of the pair of couplers 10a and 10b in one circumferential direction or the other circumferential direction does not make the coupling main bodies 12 of the pair of couplers 10a and 10b rotate to separate the pair of couplers 10a and 10b from each other.

In order to release the coupling of the couplers 10a and 10b according to this embodiment and coupled with each other, the coupling main bodies 12 of the pair of couplers 10a and 10b must be simultaneously held, and then the rotations of the couplers 10a and 10b relative to each other required to release the coupling of the couplers 10a and 10b must be forcibly produced. In order to facilitate these relative rotations of the couplers 10a and 10b, a friction increasing work such as knurling may be applied on the outer peripheral surfaces of the coupling main bodies 12 of the pair of couplers 10a and 10b or tool engagement indents with which non-illustrated tools for assisting the relative rotations are detachably engaged may be formed on the same.

Sixteenth Embodiment

Next, a coupling apparatus including a release preventing structure and according to a sixteenth embodiment of the present invention will be described with reference to FIGS. 35 and 36.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, in at least one of the pair of couplers 10a and 10b to be coupled with each other, the coupling main body 12 accommodates the liner 22 so that the liner 22 can move in the longitudinal direction of the coupling main body 12. In the coupling main body 12, cam-shaped release preventing members 190a of a release preventing mechanism 190 are arranged at a plurality of positions separated at equal intervals in a circumferential direction of the coupling main body 12. The cam-shaped release preventing members 190a are accommodated in through holes formed at the plurality of positions in the outer surface of the coupling main body 12, and each of these members is supported by the coupling main body 12 by using a rotational center shaft 190b so that the release preventing member 190a rotates in a plane crossing the outer surface. An operation lever 190c of an operation mechanism extends from the cam-shaped release preventing member 190a into an outside space via the through hole. The operation lever 190c can swing in the longitudinal direction of the coupling main body 12 with the rotational center shaft 190b acting as its rotation center.

An annular groove 192 is formed in the outer peripheral surface of the liner 22, and the cam-shaped release preventing members 190a are fitted in the annular groove 192. When each of the operation levers 190c is moved from a raised position where each of the operation levers 190c is separated and raised up from the outer peripheral surface of the coupling main body 12 to a laid down position where each of the operation levers 190c is fell down toward the outer peripheral surface of the coupling main body 12 in a direction opposite to the projecting direction of the projecting portions 14 of the coupling main body 12 and is laid on the outer peripheral surface to extend along the outer peripheral surface as shown in FIGS. 35 and 36, the liner 22 is driven by the cam-shaped release preventing members 190a and is linearly moved toward the projecting direction of the projecting portions 14 of the coupling main body 12. A position of each of the cam-shaped release preventing members 190a at this time is a release preventing position.

Figure 35:
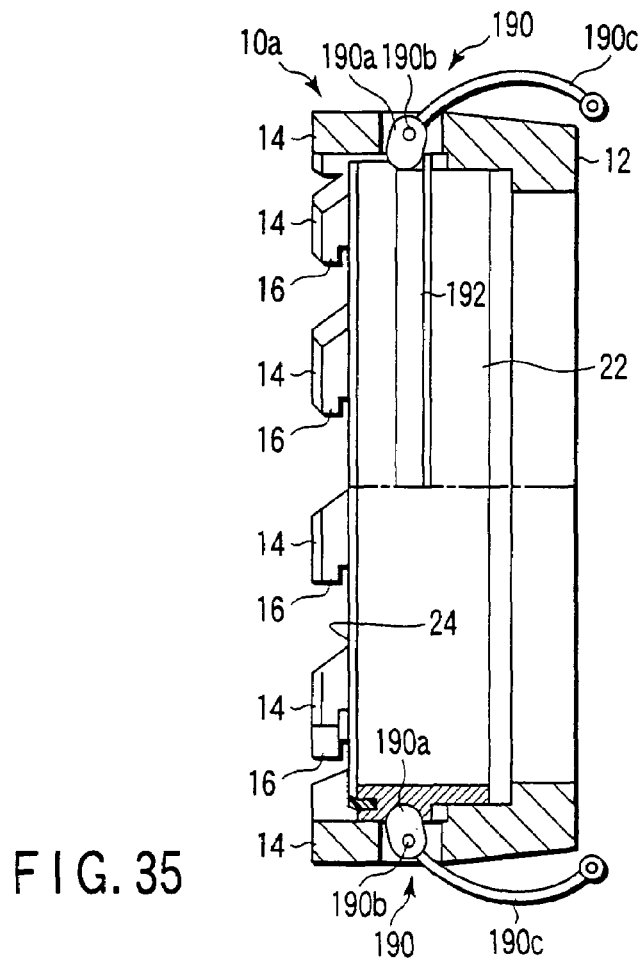
FIG. 35 is a vertical cross-sectional view of one coupler of a coupling apparatus including a release preventing structure and according to a sixteenth embodiment of the present invention.
Figure 36:
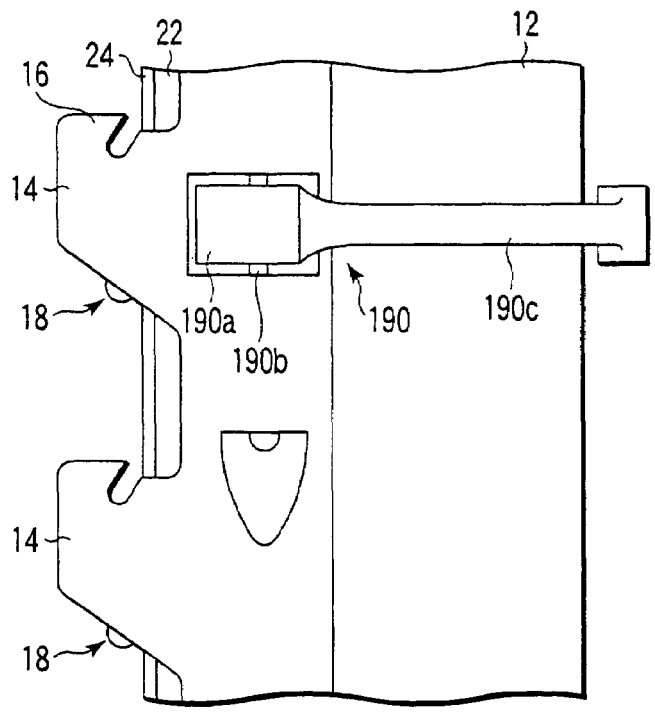
FIG. 36 is an enlarged view of a part of the one coupler shown in FIG. 35.

On the contrary, when each of the operation levers 190a is rotated from the laid down position shown in FIGS. 35 and 36 to the raised up position, the liner 22 driven by the cam-shaped release preventing members 190a are linearly moved in a direction opposite to the projecting direction in the coupling main body 12. A position of each of the cam-shaped release preventing members 190a at this time is a release position.

When the pair of couplers 10a and 10b are coupled with each other, each of the operation levers 190c is arranged at the raised up position, and each of the cam-shaped release preventing members 190a is arranged at the release position. In this time, the plurality of projecting portions 14 of the other coupler 10b are inserted into the plurality of indents between the plurality of projecting portions 14 of the one coupler 10a by moving the pair of couplers 10a and 10b closer to each other in a state that they are concentrically arranged to each other. Further, the pair of couplers 10a and 10b are rotated relative to each other by the urging forces of the urging mechanisms 18 in the projecting portions 14 of each of the couplers 10a and 10b so that engagement pieces 16 of the projecting portions 14 of the one coupler 10a are engaged with the engagement pieces 16 of the projecting portions 14 of the other coupler 10b. AS a result, the pair of couplers 10a and 10b are coupled with each other.

Thereafter, each of the operation levers 190c is arranged at the laid down position shown in FIGS. 35 and 36, and each of the cam-shaped release preventing members 190a is arranged at the release preventing position. As a result, the liners 22 in the pair of couplers 10a and 10b coupled with each other are forcibly brought into contact with each other with the seal members 24 on the protruding ends of the liners 22 being interposed therebetween, and the seal members 24 are compressed with each other to generate elastic forces in longitudinal directions of the liners 22 along which the couplers are separated from each other. This elastic forces strengthen the engagements between the engagement pieces 16 of the projecting portions 14 of the one coupler 10a and the engagement pieces 16 of the projecting portions 14 of the other coupler 10b in the longitudinal direction along which the pair of couplers 10a and 10b are separated from each other. In this state, the rotations of the couplers 10a and 10b relative to each other to release the coupling of the couplers 10a and 10b cannot be performed.

In order to allow the rotations of the couplers 10a and 10b relative to each other to release the coupling of the couplers 10a and 10b, each of the operation levers 190c are rotated from the laid down position shown in FIGS. 35 and 36 to the raised up position.

Seventeenth Embodiment

Next, a coupling apparatus including a release preventing structure and according to a seventeenth embodiment of the present invention will be described with reference to FIGS. 37 and 38.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

In this embodiment, release preventing members 200a of release preventing mechanism 200 are arranged at a plurality of positions in the coupling main body 12 of at least one of the pair of couplers 10a and 10b to be coupled with each other, these positions being separated from each other in a circumferential direction of the coupling main body 12 at equal intervals. The release preventing members 200a are accommodated in through holes formed at the plurality of positions in the outer surface of the coupling main body 12, and are supported by the coupling main body 12 by using rotational center shafts 200b so that each of the release preventing members 200a swings in a plane crossing the outer surface. An operation lever 200c of an operation mechanism extends from the release preventing member 200a to the outside space through the through hole. The operation lever 200c can swing in the longitudinal direction of the coupling main body 12 with the rotational center shaft 200b acting as a rotational center.

Figure 37:
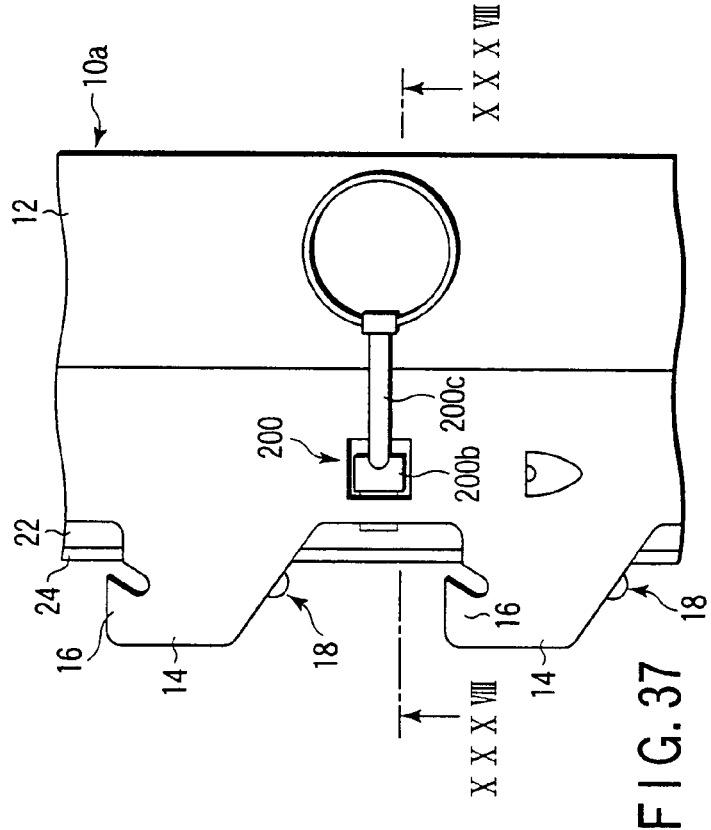
FIG. 37 is an enlarged view of a part of one coupler of a coupling apparatus including a release preventing structure and according to a seventeenth embodiment of the present invention.
Figure 38:
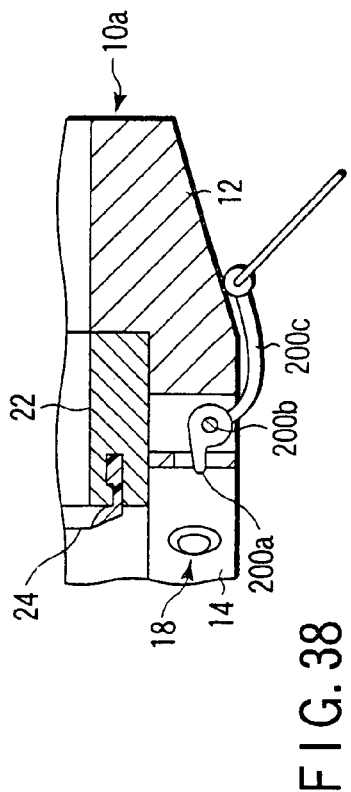
FIG. 38 is a cross-sectional view of the part of the one coupler taken along a line XXXVIII-XXXVIII in FIG. 37.

When each of the operation levers 200c is moved from a raised up position where each of the operation levers 200c is separated and raised up from the outer peripheral surface of the coupling main body 12 to a laid down position where each of the operation levers 200c is laid on the outer peripheral surface and is extended in a direction opposite to the projecting direction of the projecting portions 14 of the coupling main body 12 as shown in FIGS. 37 and 38, a part of each of the release preventing members 200a protrudes toward the protruding direction of the projecting portions 14 from one of the bottom surfaces of the plurality of indents between the projecting portions 14 of the coupling main body 12. A position of each of the release preventing members 200a at this time is a release preventing position.

On the contrary, when each of the operation levers 200c is rotated from the laid down position shown in FIGS. 37 and 38 to the raised up position, the part of each of the release preventing members 200a is retracted into the one of the bottom surfaces of the plurality of indents not to substantially project from the one of the bottom surfaces. A position of each of the release preventing members 200a at this time is a release position.

In order to couple the pair of couplers 10a and 10b with each other, each of the operation levers 200c is arranged at the raised up position and each of the release preventing members 200a is arranged at the release position. In this state, the plurality of projecting portions 14 of the other coupler 10b are inserted into the plurality of indents between the plurality of projecting portions 14 of the one coupler 10*a* by moving the pair of couplers 10*a* and 10*b* closer to each other in a state that they are concentrically arranged to each other. Further, the pair of couplers 10*a* and 10*b* are rotated relative to each other by the urging forces of the urging mechanisms 18 in the plurality of projecting portions 14 of each of the pair of couplers 10*a* and 10*b* so that engagement pieces 16 of the projecting portions 14 of the one coupler 10*a* are engaged with the engagement pieces 16 of the projecting portions 14 of the one coupler 10*a*. As a result, the pair of couplers 10*a* and 10*b* are coupled with each other.

Thereafter, each of the operation levers 200*c* is arranged at the laid down position shown in FIGS. 37 and 38, and each of the release preventing members 200*a* is arranged at the release preventing position. As a result, the part of each of the release preventing members 200*a* protruding from the bottom surface of one of the indents between the projecting portions 14 of the coupling main body 12 of the one coupler 10*a* comes into contact with or approaches the projecting end of one of the projecting portions 14 of the other coupler 10*b* corresponding to the one of the bottom surfaces of the indents of the one coupler 10*a* into which the one projecting portion 14 of the other coupler 10*b* is inserted.

The each of the projected portions of the release preventing members 200*a* arranged at the release preventing positions pushes the projecting end of one of the projecting portions 14 of the other coupler 10*b* corresponding to the bottom surface of one of the indents of the one coupler 10*a*, into which the one projecting portion 14 of the other coupler 10*b* is inserted, to move the projecting end away from the one bottom surface, or prevents the projecting end of the one projecting portion 14 of the other coupler 10*b* from approaching the bottom surface of the one indent of the one coupler 10*a*.

As a result, the engagements between the engagement pieces 16 of the projecting portions 14 of the coupling main body 12 of the one coupler 10*a* and the engagement pieces 16 of the projecting portions 14 of the coupling main body 12 of the other coupler 10*b* are strengthened or not weakened. In this state, the pair of couplers 10*a* and 10*b* coupled with each other can not be rotated relative to each other to release the coupling of the pair of couplers 10*a* and 10*b*.

In order to allow the rotations of couplers 10*a* and 10*b* to release the coupling thereof, each of the operation levers 200*c* is rotated from the laid down position shown in FIGS. 37 and 38 to the raised up position.

The release preventing members 200 may be provided in the other coupler 10*b* like in the other coupler 10*a*, and any of release preventing members 200 may be provided at any positions corresponding to any of the bottom surfaces of the indents in each of the pair of couplers 10*a* and 10*b*.

Eighteenth Embodiment

Figure 39:
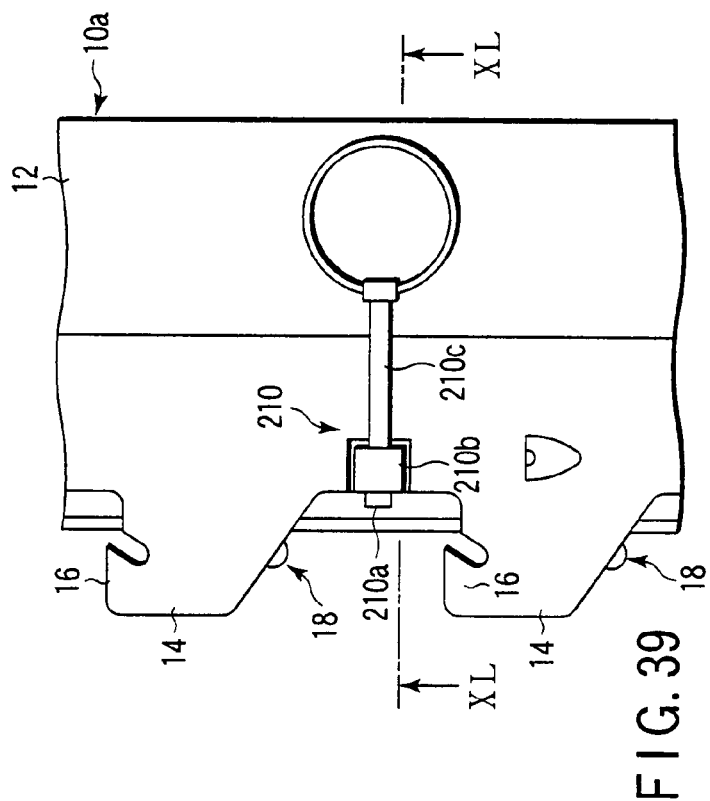
FIG. 39 is an enlarged view of a part of one coupler of a coupling apparatus including a release preventing structure and according to an eighteenth embodiment of the present invention.
Figure 40:
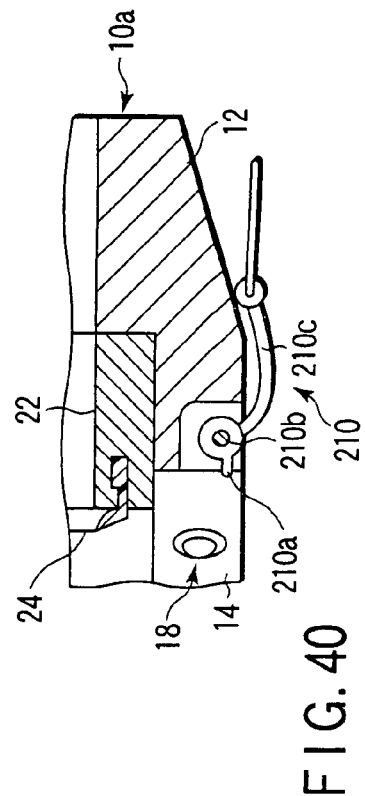
FIG. 40 is an enlarge view of the part of the one coupler taken along a line XL-XL in FIG. 39.

FIGS. 39 and 40 show a coupling apparatus including a release preventing structure and according to an eighteenth embodiment of the present invention.

It is noted that structural members of this embodiment similar to those of the conventional coupling apparatus described with reference to FIG. 41 to 43 are designated by the same reference numerals as those designating the structural members corresponding thereto in FIG. 41 to 43, and detailed descriptions thereof are omitted.

Moreover, a major part of the structure of the eighteenth embodiment is equal to a major part of the structure of the seventeenth embodiment described above with reference to FIGS. 37 and 38. Therefore, operations of the eighteenth embodiment and technical advantages obtained by the eighteenth embodiment are substantially the same as those of and obtained by the seventeenth embodiment. Therefore, structural members in the eighteenth embodiment corresponding to those in the seventeenth embodiment are designated with reference numerals obtained by adding ten to the reference numerals used in the seventeenth embodiment to designate the corresponding structural members, and detailed descriptions about these structural members will be omitted.

A part of the structure of the eighteenth embodiment being different from the structure of the seventeenth embodiment will be described in the followings.

A shape of the cross section of each through hole in which each release preventing member 210 is accommodated in the eighteenth embodiment is different from that of each through hole in which each release preventing member 200 is accommodated in the seventeenth embodiment. In the each through hole in the eighteenth embodiment, one opening, which is opened in the bottom surface of the one indent and through which the part of the release preventing member 210*a* arranged in the release preventing position protrudes into the one indent, and another opening, which is opened in the outer peripheral surface of the coupling main body 12 and through which the operating lever 210*c* extends into the outer space, are not separated from each other by a partition wall provided therebetween. But, in the each through hole in the seventeenth embodiment, one opening, which is opened in the bottom surface of the one indent and through which the part of the release preventing member 200*a* arranged in the release preventing position protrudes into the one indent, and another opening, which is opened in the outer peripheral surface of the coupling main body 12 and through which the operating lever 200*c* extends into the outer space, are separated from each other by a partition wall provided therebetween.

The partition wall increases the strength of each through hole of the seventeenth embodiment more that that of each through hole of the eighteenth embodiment.

The coupling apparatus including the release preventing structure and according to the present invention can assuredly prevent the coupling apparatus, which comprises a pair of coupling main bodies having the same structure as to each other and being coupled with each other when they are moved closer to each other after they are coaxially arranged to each other, from releasing a coupling of the coupling main bodies contrary to a user's wish. Further, the coupling apparatus can be used to detachably couple pipes through which a fluid flows with each other, and it can be also used to detachably couple a plurality of pipes or solid shafts for a structure with each other.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A coupling apparatus including a release preventing structure, comprising:

a pair of cylindrical coupling main bodies which are concentrically and oppositely arranged to each other and have the same structure as to each other; and liners respectively accommodated in the coupling main bodies, wherein each of the coupling main bodies includes a plurality of projecting portions which extend along a longitudinal center line of each coupling main body from a plurality of positions separated from each other at predetermined intervals on a concentric circle having the same diameter on each of opposing surfaces of the coupling main bodies, an engagement piece is provided at a projecting end portion of each of the projecting portions on a side surface facing in one circumferential direction of each of the coupling main bodies in each of the projecting portions, the engagement piece having an engagement surface facing in a direction opposite to the protruding direction of the projecting portion, the pair of coupling main bodies are approached to each other in a state that the coupling main bodies are concentrically opposed to each other, the projecting portions of one coupling main body are inserted into a plurality of indents between the projecting portions of the other coupling main body, and further the coupling main bodies are rotated relative to each other so that engagement surfaces of the projecting portions of the one coupling main body face the engagement surfaces of the projecting portions of the other coupling main body to engage the engagement surfaces of the projecting portions of the one coupling main body with the engagement surfaces of the projecting portions of the other coupling main body in a direction along which the pair of coupling main bodies are separated from each other, wherein at least one of the coupling main bodies can rotate on an outer peripheral surface of the liner corresponding to the at least one coupling main body at a predetermined position along the longitudinal center line of the at least one coupling main body without moving in a direction along the longitudinal center line and without disengaging from the other coupling main body.

* * * * *